(12) United States Patent
Holtan et al.

(10) Patent No.: US 9,994,246 B2
(45) Date of Patent: Jun. 12, 2018

(54) CART TRANSPORTING APPARATUS

(71) Applicant: Dane Technologies, Inc., Brooklyn Park, MN (US)

(72) Inventors: Paul Holtan, Savage, MN (US); Andrew Dvorak, Minnetonka, MN (US)

(73) Assignee: Dane Technologies, Inc., Brooklyn Park, MN (US)

( * ) Notice: Subject to any disclaimer, the term of this patent is extended or adjusted under 35 U.S.C. 154(b) by 594 days.

(21) Appl. No.: 14/503,974

(22) Filed: Oct. 1, 2014

(65) Prior Publication Data
US 2015/0203140 A1   Jul. 23, 2015

Related U.S. Application Data

(63) Continuation of application No. 13/725,212, filed on Dec. 21, 2012, now Pat. No. 8,870,211, which is a
(Continued)

(51) Int. Cl.
| B62D 1/04 | (2006.01) |
|---|---|
| B62B 5/00 | (2006.01) |
| B60D 1/36 | (2006.01) |
| B60D 1/02 | (2006.01) |
| B62B 3/00 | (2006.01) |

(Continued)

(52) U.S. Cl.
CPC .............. *B62B 5/0079* (2013.01); *B60D 1/02* (2013.01); *B60D 1/04* (2013.01); *B60D 1/36* (2013.01); *B60D 1/363* (2013.01); *B62B 3/00* (2013.01); *B62B 3/001* (2013.01); *B62B 3/002* (2013.01); *B62B 3/008* (2013.01); *B62B 3/14* (2013.01); *B62B 5/00* (2013.01); *B62B 5/0033* (2013.01);
(Continued)

(58) Field of Classification Search
CPC ... B60D 1/36; B60D 1/06; B62D 5/00; B62D 5/0079; B62D 3/002; A01B 12/006
See application file for complete search history.

(56) References Cited

U.S. PATENT DOCUMENTS

| 1,677,618 | A | * | 7/1928 | Clement | ................ | B62D 63/06 |
| | | | | | | 235/62 F |
| 3,223,434 | A | * | 12/1965 | Quayle | .................. | B62D 53/00 |
| | | | | | | 280/408 |

(Continued)

FOREIGN PATENT DOCUMENTS

JP          62149504 A   *   7/1987   ............. B60D 1/167

*Primary Examiner* — Joseph M Rocca
*Assistant Examiner* — Daniel S Yeagley
(74) *Attorney, Agent, or Firm* — Davis, Brown, Koehn, Shors & Roberts, P.C.; Sean D. Solberg

(57) ABSTRACT

A cart transporting apparatus including a hitch assembly and a cart coupling assembly. The hitch assembly may include an elongated body, at least one catch member, and a hitch stop. The hitch stop may be, for example, a rotating hitch stop or a sliding hitch stop. The rotating hitch stop may include at least three flanges configured to abut a cart and may further include a detent mechanism. The cart coupling assembly may include at least a first portion and a second portion. The first portion may be pivotally coupled to the second portion. The first portion may include first and second engagement members. The second portion may include third and fourth engagement members.

17 Claims, 53 Drawing Sheets

Related U.S. Application Data continuation of application No. 12/420,969, filed on Apr. 9, 2009, now Pat. No. 8,360,459.

(60) Provisional application No. 61/095,907, filed on Sep. 10, 2008, provisional application No. 61/127,784, filed on May 14, 2008, provisional application No. 61/044,192, filed on Apr. 11, 2008.

(51) Int. Cl.
*B60D 1/04* (2006.01)
*B62B 3/14* (2006.01)

(52) U.S. Cl.
CPC ....... *B62B 2205/20* (2013.01); *B62B 2207/00* (2013.01)

(56) References Cited

U.S. PATENT DOCUMENTS

| | | | | | |
|---|---|---|---|---|---|
| 3,384,937 | A | * | 5/1968 | Muncke | A01B 59/004 172/439 |
| 3,404,901 | A | * | 10/1968 | Rau | A01B 59/002 172/272 |
| 3,572,759 | A | * | 3/1971 | Baugh | A01B 59/062 172/272 |
| 5,435,586 | A | * | 7/1995 | Smith | B62D 53/061 280/425.2 |
| 5,529,427 | A | * | 6/1996 | Bost | A47C 1/124 280/250.1 |
| 5,573,078 | A | * | 11/1996 | Stringer | B60K 1/00 180/11 |
| 6,070,679 | A | * | 6/2000 | Berg | B62B 3/1404 180/19.2 |
| 6,485,046 | B1 | * | 11/2002 | Hsueh | B60D 1/065 280/455.1 |
| 7,364,181 | B2 | * | 4/2008 | Patterson | B60D 1/04 172/272 |
| 7,712,558 | B2 | * | 5/2010 | Helson | B62B 5/0079 180/19.1 |
| 2004/0195803 | A1 | * | 10/2004 | Brown | B60D 1/00 280/504 |

* cited by examiner

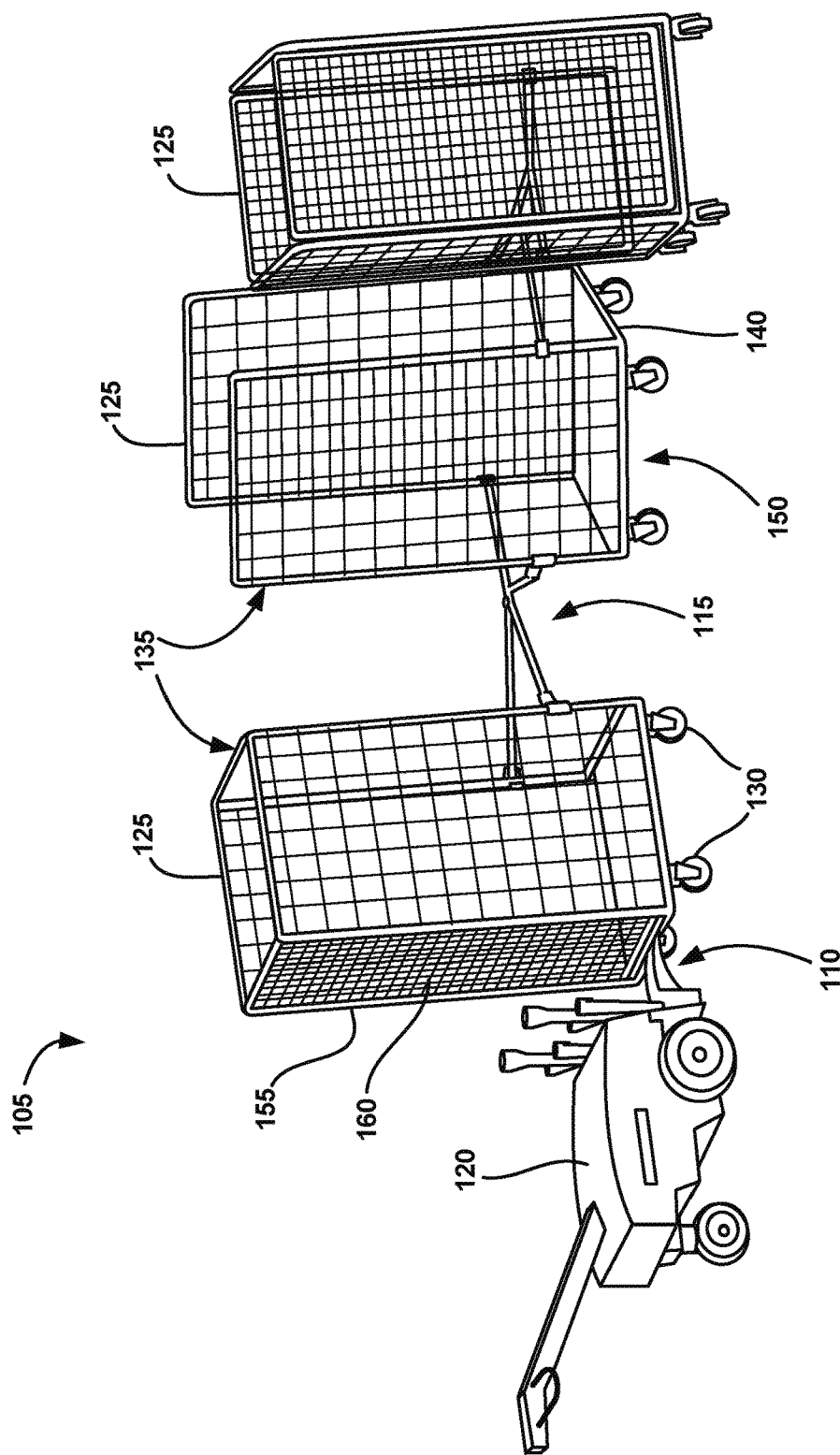

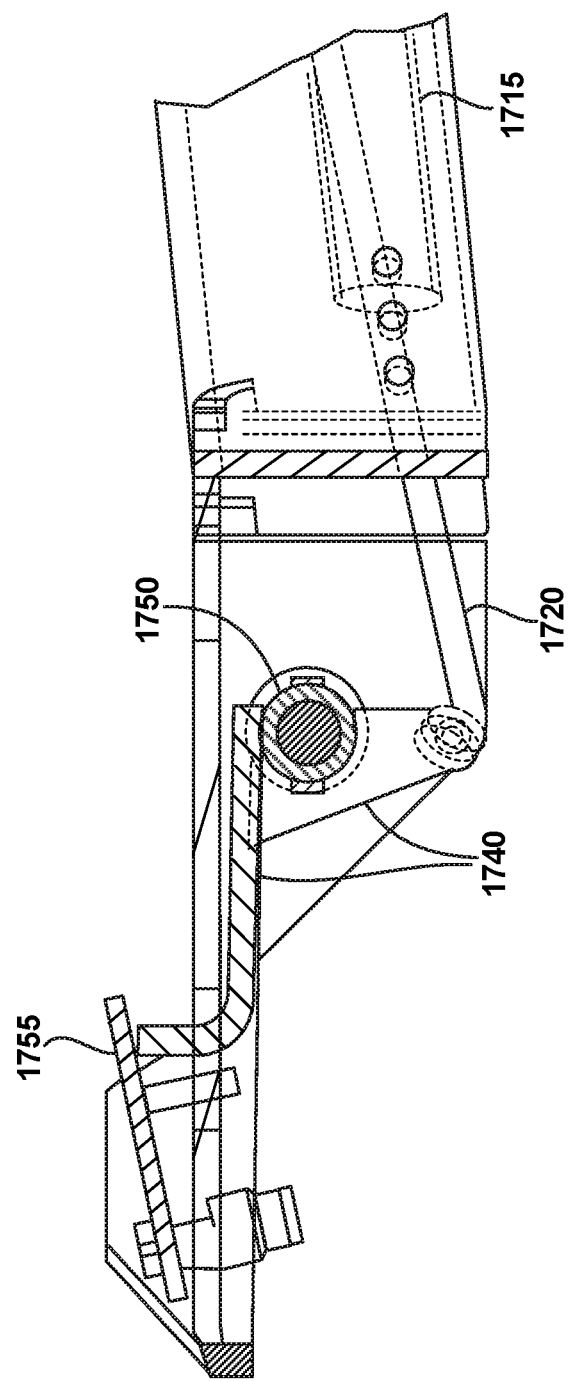

CART TRANSPORTING APPARATUS

CROSS REFERENCE TO RELATED APPLICATIONS

This application is a continuation application of U.S. patent application Ser. No. 13/725,212, filed on Dec. 21, 2012, which is a divisional application of U.S. patent application Ser. No. 12/420,969, filed on Apr. 9, 2009 which claims the benefit of U.S. Provisional Patent Application No. 61/044,192, filed on Apr. 11, 2008; U.S. Provisional Patent Application No. 61/127,784, filed on May 14, 2008; and U.S. Provisional Patent Application No. 61/095,907, filed on Sep. 10, 2008; the entire contents of all of which are incorporated herein by reference.

FIELD OF THE INVENTION

The present disclosure relates to cart transporting apparatus and methods for assisting in the transport of wheeled carts. More particularly, the present disclosure relates to apparatus, devices, and methods for coupling cart movers to wheeled carts and for coupling multiple wheeled carts together.

BACKGROUND OF THE INVENTION

Some stores, warehouses, etc., such as grocery store chains, use carts, such as roll cages, to move product from one location to another, such as from a distribution center to the grocery store. The use of carts has reduced the waste material from pallets and plastic wrapping that typically surrounds the product delivered from the distribution center. The product is protected inside the cart and the cart may be returned to the distribution center for refilling when empty. A store chain may have as many as hundreds of thousands of the carts in its distribution network.

In the store, for example, an individual operator may have to push or pull a full cart a long distance from the back of the store to the front to restock shelves. Moving the full carts may cause repetitive strain injuries or other workplace injuries. Further, an individual operator may be able to move only one full cart and one or two empty carts at a time.

Some distribution centers or stores may use cart pulling or cart pushing devices, or movers, to transport carts. However, a distribution center or store may have several different types of carts and each cart may require a different type of hitch to couple the cart to a mover. Thus, a distribution center or store may require several movers, each dedicated to a specific type of cart.

In addition, in order to move multiple carts, an operator may use a length of chain to connect one cart to the next. However, the chain does not keep the carts from wandering from side to side or rolling forward and hitting the cart in front of it, nor do the chains provide for controlled turns. The cost of reworking individual carts to provide a common coupling method may be relatively expensive when many carts, up to as many as hundreds of thousands, could require modification. These factors may contribute to reduced efficiency and/or increased costs in the distribution center or store.

Thus, there exists a need in the art for improved apparatus, devices, and methods for coupling cart movers to wheeled carts and for coupling multiple wheeled carts together. Particularly, there is a need in the art for apparatus, devices, and methods for moving multiple carts and carts with different configurations and/or dimensions with increased efficiency and without causing workplace injuries.

BRIEF SUMMARY OF THE INVENTION

The present disclosure, in one embodiment, relates to a cart transporting apparatus. The cart transporting apparatus may include a hitch stop assembly and a cart coupling assembly. The hitch stop assembly may include an elongated body, at least one catch member, and a hitch stop operably coupled to the body and configured to move about a horizontal plane relative to the body. In further embodiments, the hitch assembly may include a swinging or rotating latch end that may releasably engage with the frame of the cart. The cart coupling assembly may include at least a first portion and a second portion. The first portion may be pivotally coupled to the second portion. The first portion may include first and second engagement members. The second portion may include third and fourth engagement members. In some embodiments, the hitch stop may be a rotating hitch stop and may include at least three flanges configured to abut a cart. In some embodiments, the hitch stop may further include a detent mechanism. In some embodiments, the hitch stop may be a sliding hitch stop.

The present disclosure, in another embodiment, relates to a hitch stop assembly. The hitch stop assembly may include an elongated body, at least one catch member and a hitch stop operably coupled to the body and configured to move about a horizontal plane relative to the body. In some embodiments, the hitch stop may be a rotating hitch stop and may include at least three flanges configured to abut a cart. In some embodiments, the hitch stop may further include a detent mechanism. In some embodiments, the hitch stop may be a sliding hitch stop.

The present disclosure, in a further embodiment, relates to a cart coupling assembly. The cart coupling assembly may include at least a first portion and a second portion. The first portion may be pivotally coupled to the second portion. The first portion may include first and second engagement members. The second portion may include third and fourth engagement members.

The present disclosure, in yet another embodiment, relates to a cart transporting apparatus. The cart transporting apparatus may include a hitch assembly and a cart coupling assembly. The hitch assembly may include an elongated body and a rotating latch. The cart coupling assembly may include an engagement member including arms in a fixed relationship relative to each other.

While multiple embodiments are disclosed, still other embodiments of the present disclosure will become apparent to those skilled in the art from the following detailed description, which shows and describes illustrative embodiments of the disclosure. As will be realized, the embodiments are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 1 is an isometric view of a cart transporting apparatus having a hitch assembly and a cart coupling assembly according to one embodiment of the present disclosure.

FIG. 17F is a partial cross-sectional view of the hitch assembly of FIG. 17A.

DETAILED DESCRIPTION

Figure 2A:
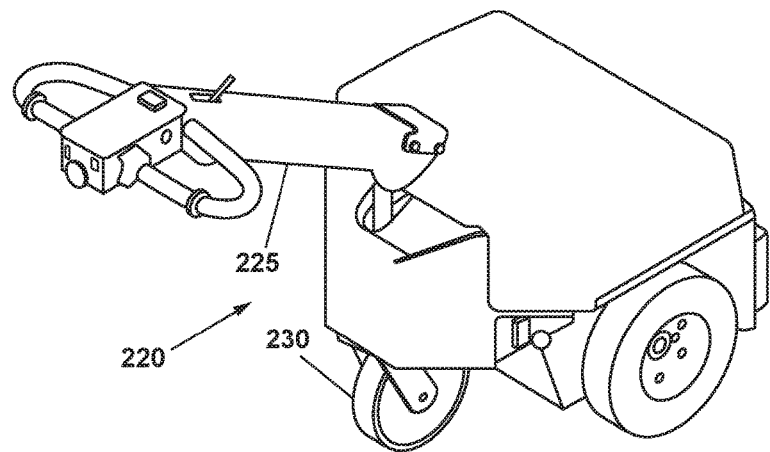
FIG. 2A is a rear isometric view of a cart mover according to one embodiment of the present disclosure.

The present disclosure relates to novel and advantageous cart transporting apparatus and methods for assisting in the transport of wheeled carts. More particularly, the present disclosure relates to novel and advantageous apparatus, devices, and methods for coupling cart movers to wheeled carts and for coupling multiple wheeled carts together. As stated above, example uses for the various embodiments of a cart transporting apparatus of the present disclosure can include use in stores, distribution centers, warehouses, etc., such as but not limited to grocery store chains, for moving product from one location to another, such as from a distribution center to the grocery store.

A cart transporting apparatus of the present disclosure may include a hitch assembly and a cart coupling assembly for transporting carts, such as roll cages. The cart transporting apparatus can increase efficiency because it allows an organization, such as a grocery store distribution center, to transport multiple carts and multiple types of carts with a single cart mover. The cart transporting apparatus can also decrease workplace injuries associated with an operator pushing or pulling a cart without mechanical assistance. The cart transporting apparatus may also reduce costs because individual carts require minimal modification, if any, in order to provide a common coupling mechanism.

The hitch assembly can be configured to be coupled to a cart mover and a cart. The hitch assembly may include a hitch stop configured to engage multiple types of carts, wherein each type of cart may require a different type of stop. In some embodiments, the hitch stop may be a rotating hitch stop. In other embodiments, the hitch stop may be a sliding hitch stop. In further embodiments, the hitch assembly may include a swinging or rotating latch end that may releasably engage with the frame of the cart. The hitch assembly can also increase efficiency because it allows an organization to transport multiple types of carts with a single hitch assembly, thereby generally eliminating the need to change out the hitch assembly or to have one or more cart movers dedicated to moving only one type of cart. However, it is recognized that in some embodiments, where cart types are particularly unique, a hitch adapted to a single style of cart may be desirable.

The cart coupling assembly may include engagement members configured to releasably couple a first cart to a second cart. In some embodiments, the engagement members may also be pivotally coupled to each other. In some embodiments, the assembly may include an engagement member with arms in a fixed relationship and may include a spring member. The cart coupling assembly can increase efficiency by allowing a single operator to move multiple carts at a time, rather than moving one cart at a time. The cart coupling assembly can also decrease the chance of damaging the goods being transported by hindering the forward progress of the carts such that the trailing cart is less likely to hit the cart or carts in front of it. Also, the engagement members can hinder the side to side or uncontrolled movement of the trailing carts while turning or during transport in general.

FIG. 1 illustrates an isometric view of one embodiment of a cart transporting apparatus 105 of the present disclosure. The apparatus 105 may include a hitch assembly 110 and one or more cart coupling assemblies 115. The hitch assembly 110 may releasably couple a mover 120 to a first cart 125. Each cart coupling assembly 115 can releasably couple one cart 125 to at least one other cart 125.

Figure 16A:
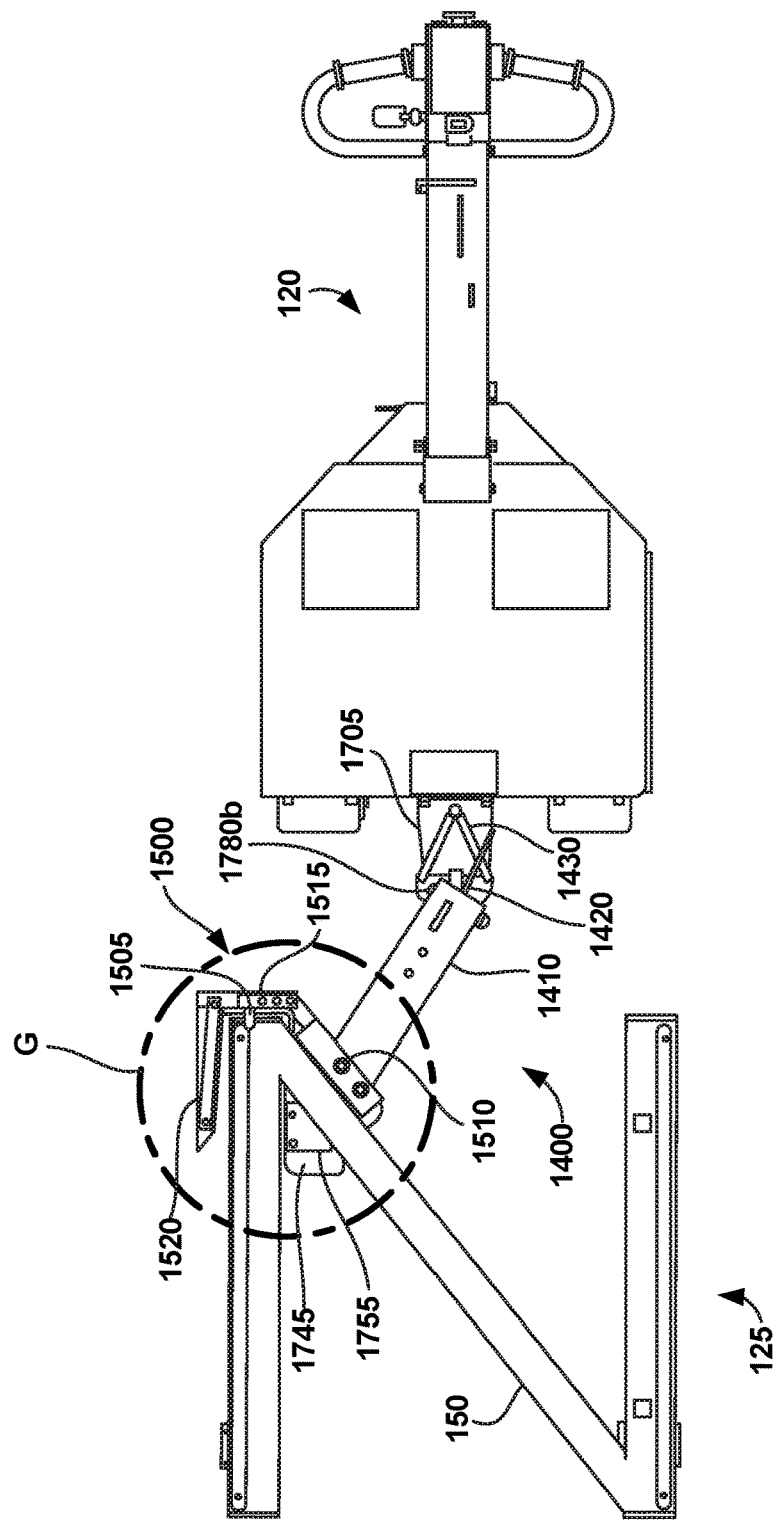
FIG. 16A is a top plan view of the hitch assembly, cart mover, and cart of FIG. 15B, wherein only the frame of the cart is shown.
Figure 16B:
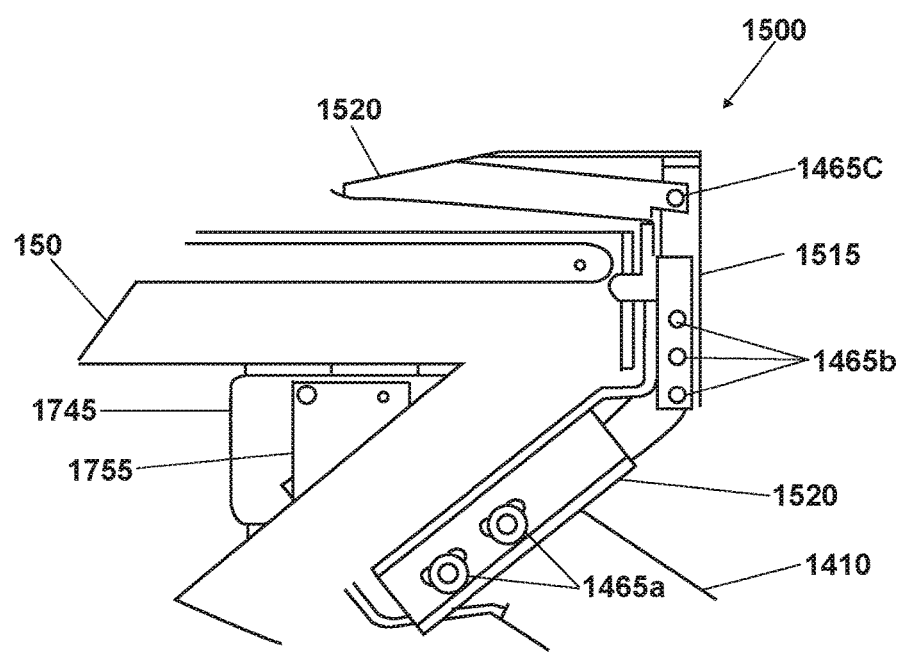
FIG. 16B is an enlarged view of area "G" of FIG. 16A.
Figure 16C:
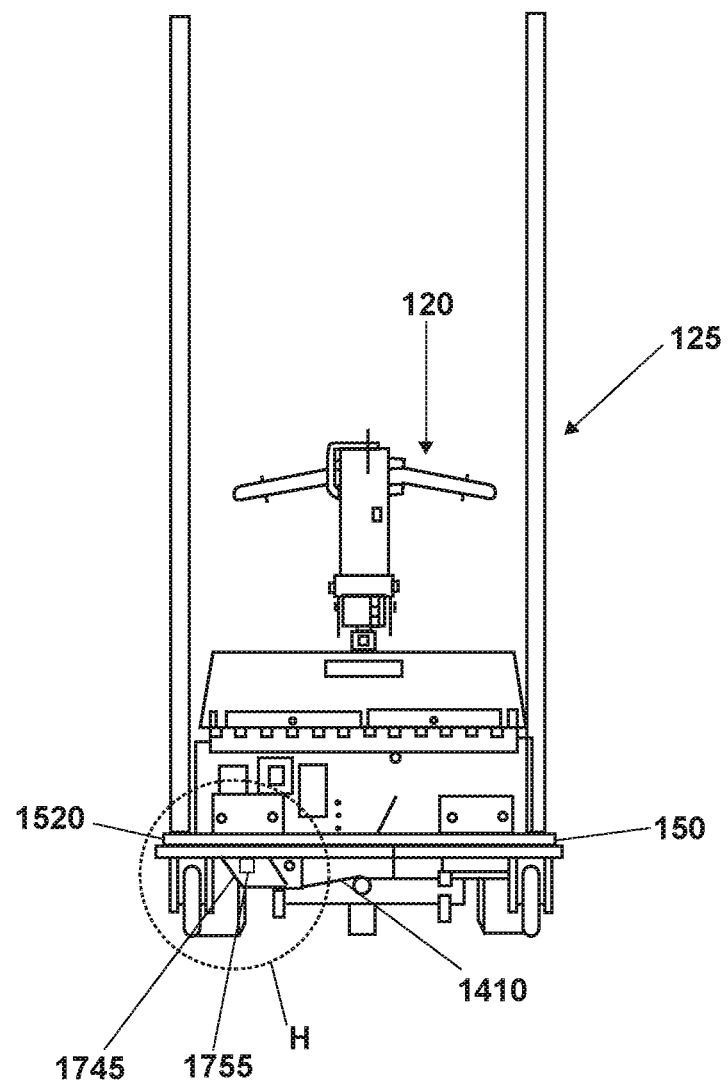
FIG. 16C is a rear view of the hitch assembly, cart mover, and cart of FIG. 15B.
Figure 16D:
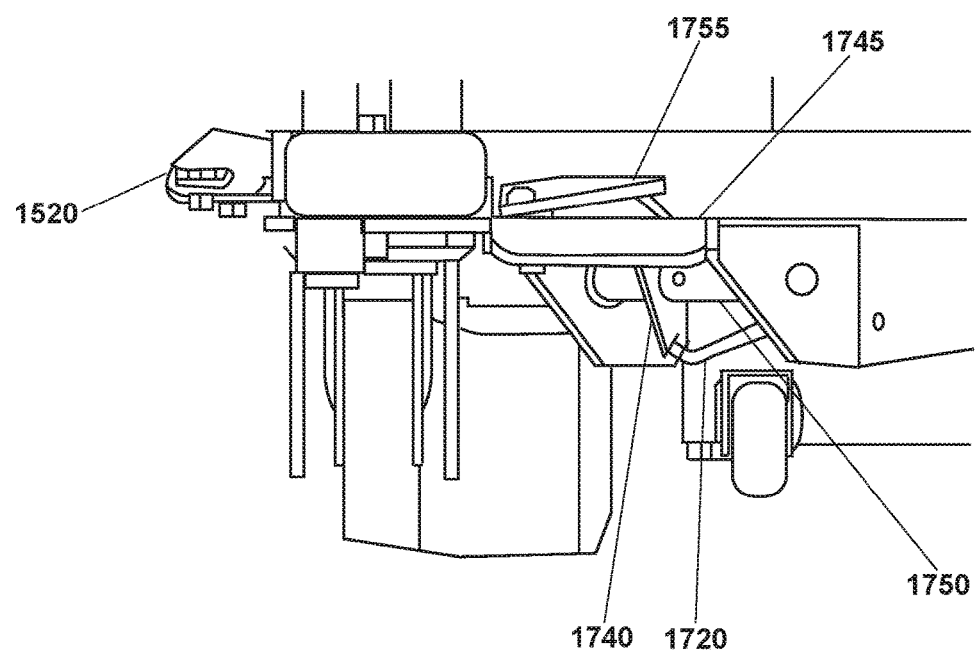
FIG. 16D is an enlarged view of area "H" of FIG. 16C.
Figure 17A:
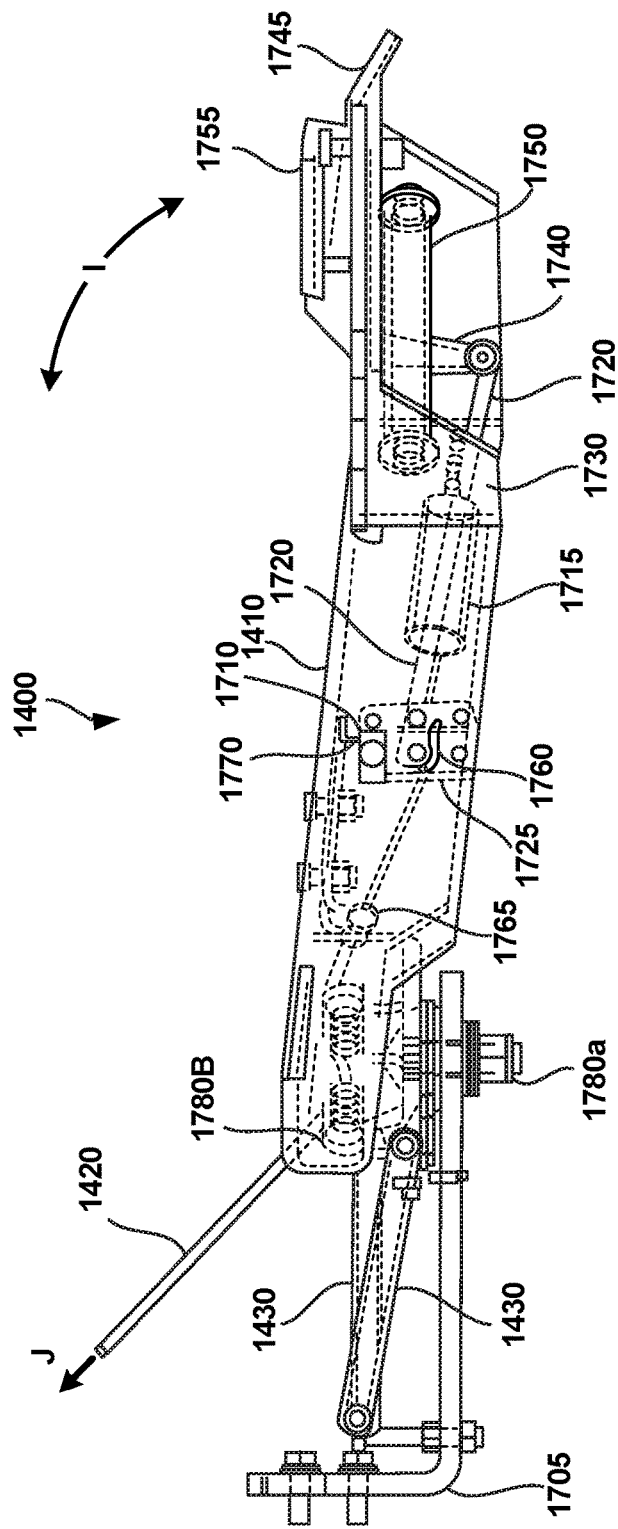
FIG. 17A is a cross-sectional view of the hitch assembly of FIG. 14A, wherein the swinging latch end is hidden for clarity purposes.
Figure 17B:
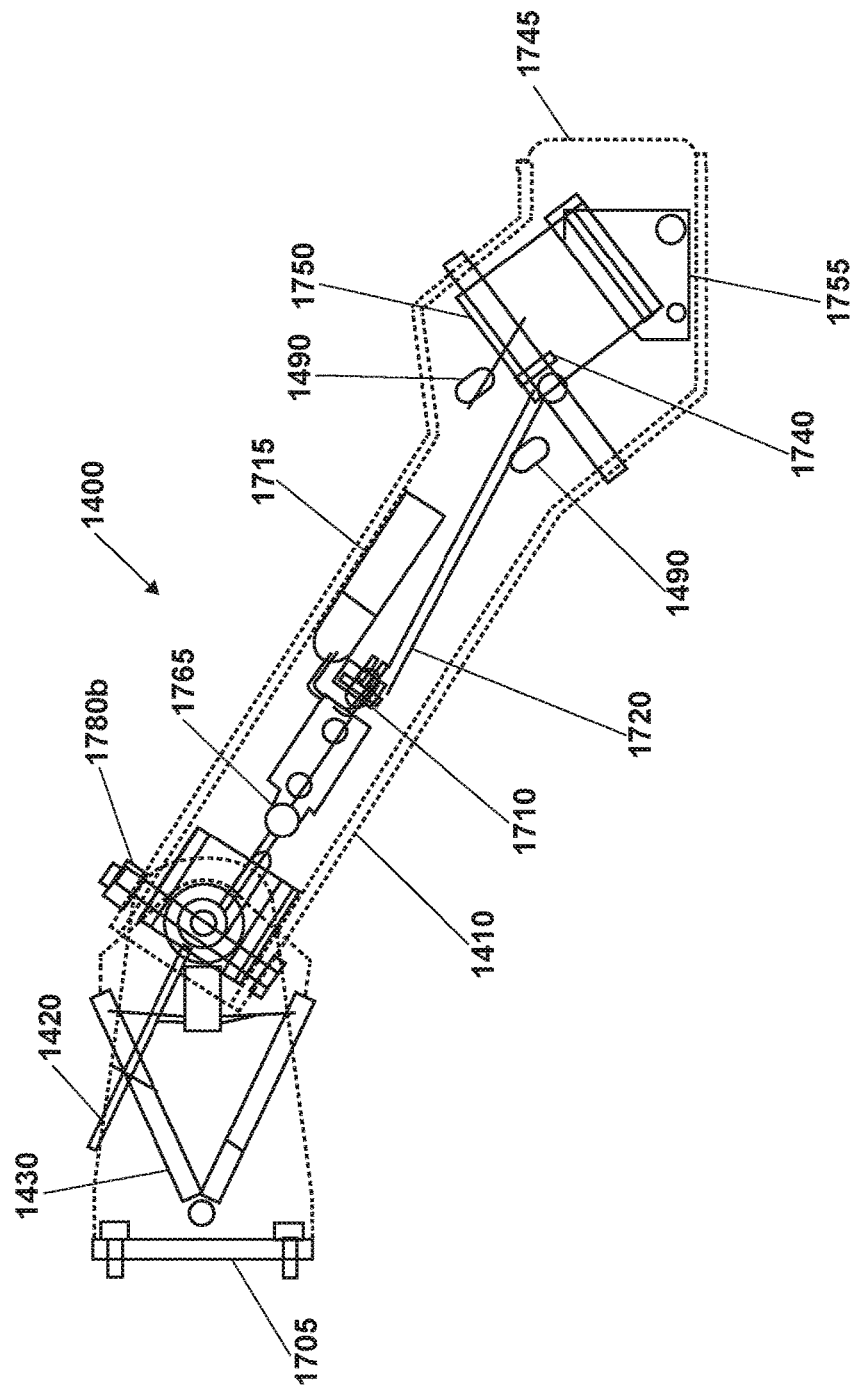
FIG. 17B is a top plan view of the hitch assembly of FIG. 17A.
Figure 17C:
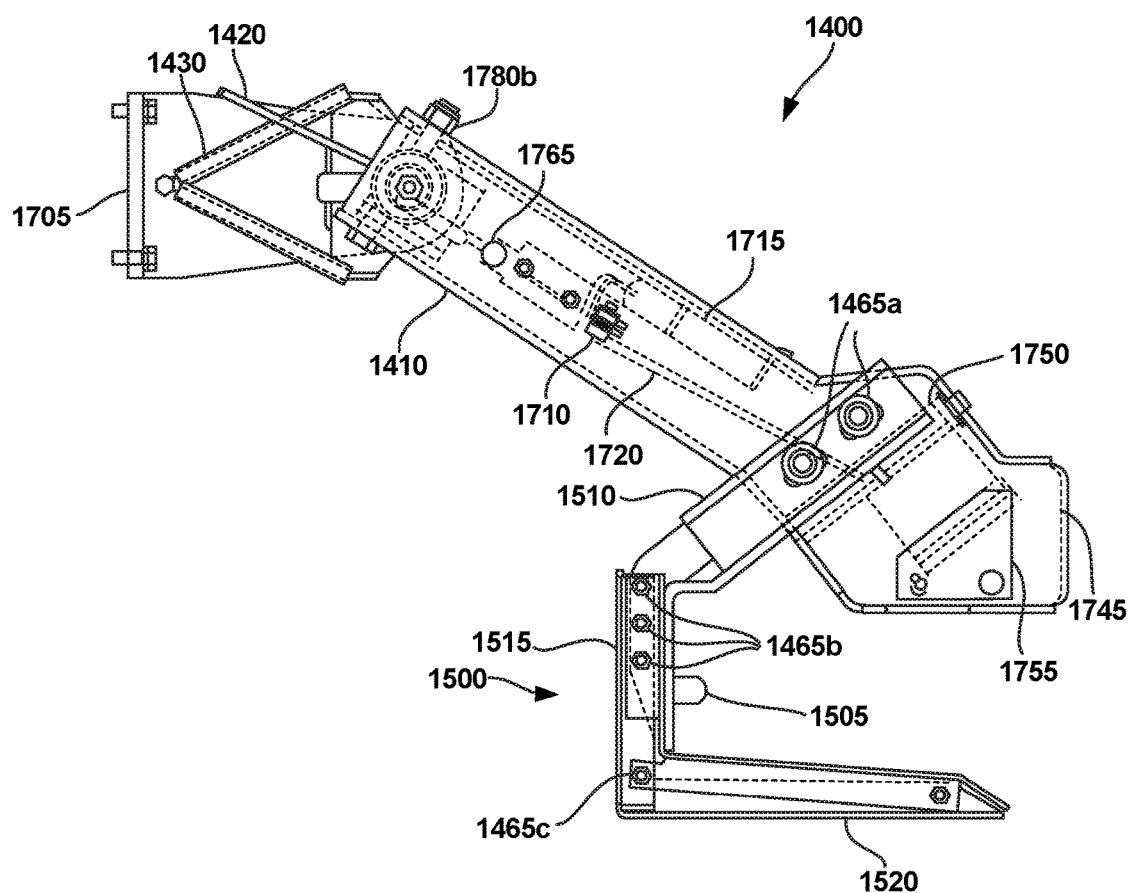
FIG. 17C is a top plan view of the hitch assembly of FIG. 14A.
Figure 17D:
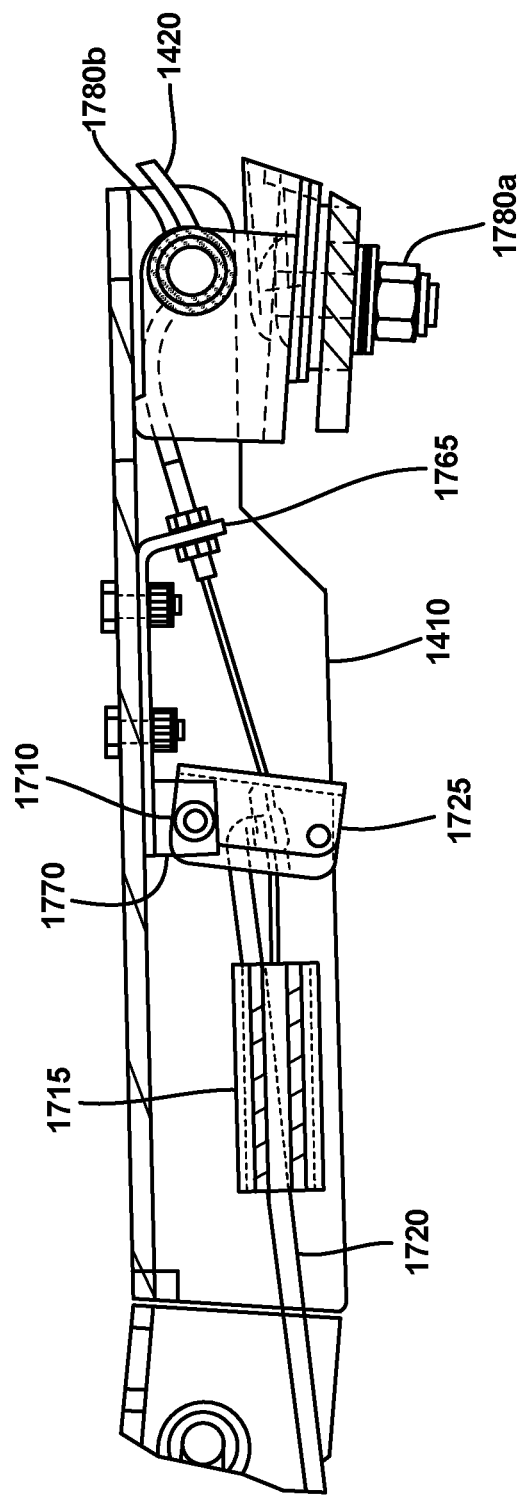
FIG. 17D is a partial cross-sectional view of the hitch assembly of FIG. 14A.
Figure 17E:
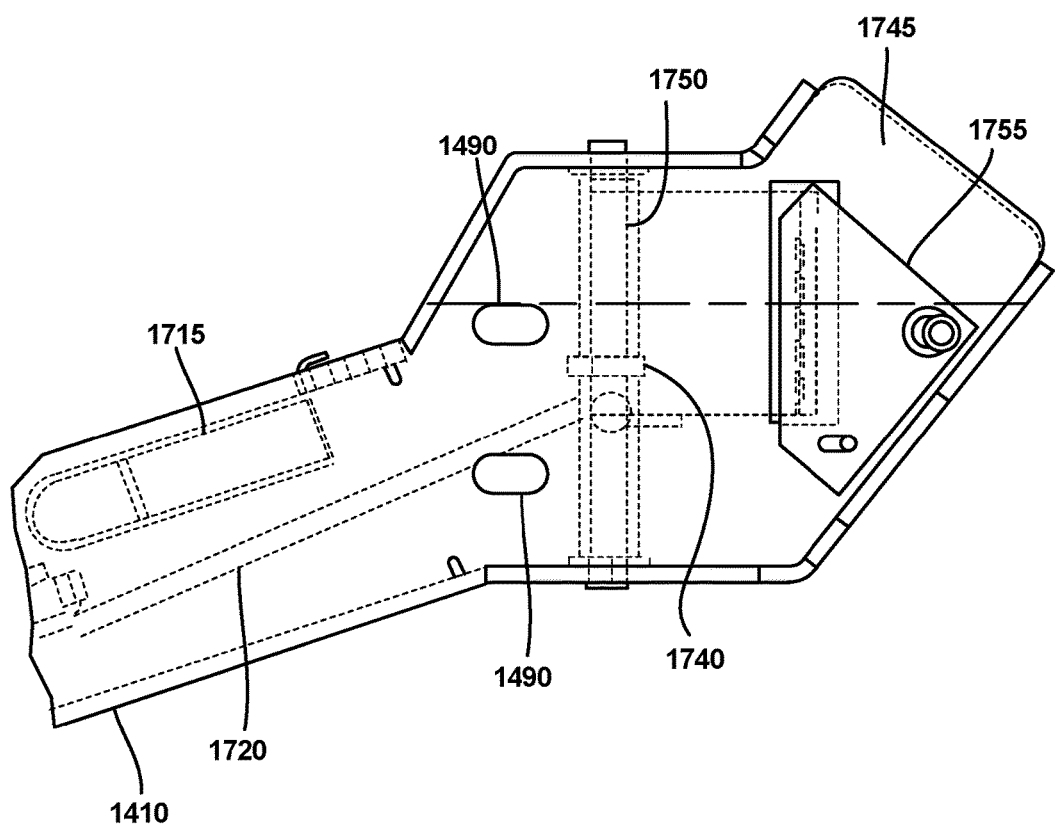
FIG. 17E is an enlarged partial top plan view of the hitch assembly of FIG. 17A.

In some embodiments, the apparatus 105 may also include one or more carts 125 and a cart mover 120. A cart 125 may include a plurality of caster wheels 130, one or more walls 135, a floor 140, and a frame 150 (also shown, for example, in FIG. 16A). In some embodiments, the cart frame 150 may be a "z" frame, but any suitable frame shape or construction may be used. In some embodiments, the carts 125 may be roll cages or other similar or appropriate device for transporting goods in a distribution center, warehouse, or store. A roll cage is a metal frame cart on fixed and swivel casters with a variably shaped floor and typically two to four sides. Typically, the sides of the cage are constructed with a perimeter of steel tubes with steel rod mesh in between. In some embodiments, for example, the carts 125 may be Four-Sided 'Z' Base Nesting Roll Pallets or Two-Sided 'Z' Base Nesting Roll Pallets, as manufactured by Symonds Hydroclean, Unit 2, Wem Trading Estate, Rogerstone, Newport, Gwent, NP10 9XX (United Kingdom).

In some embodiments, a cart 125 may have a rectangular or square shaped floor 140. In other embodiments, the floor 140 may be any other suitable shape, such as but not limited to round, pentagonal, or another curved or polygonal shape. The floor 140 may be constructed of steel, stainless steel, or other suitable material with strength appropriate for the task, such as aluminum or plastic, or any combination of suitable materials. As discussed in more detail below, the floor 140 may further include a lip or hitch engagement feature.

The walls 135 of the cart 125 may be constructed with steel tubes 155 and steel rod mesh 160. The tubes 155 may extend upwardly from the perimeter or corners of the floor 140. The steel rod mesh 160 may be connected to the steel tubes 155 and extend between or adjacent to the tubes 155 to define one or more walls 135. In some embodiments, a cart 125 may have four walls 135. In other embodiments, a cart 125 may have two walls 135. In still other embodiments, a cart 125 may have greater or fewer than four walls 135, depending upon the shape of the floor 140 or other requirements or specifications of the cart 125. In one particular embodiment, the cart 125 may be a roll cage with dimensions of approximately thirty inches wide by forty inches long by sixty inches tall and when loaded, may weigh up to 1100 lbs.

Figure 2B:
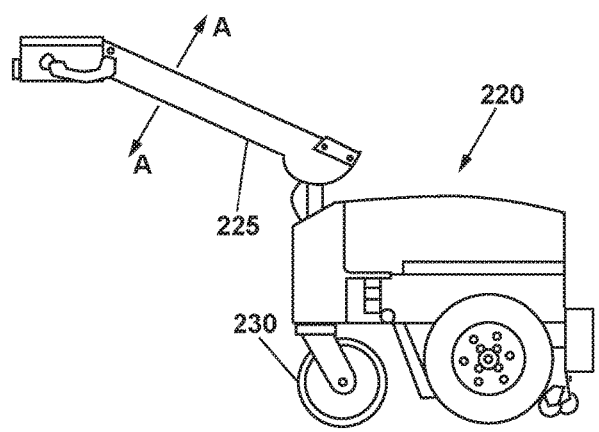
FIG. 2B is a side view of the cart mover of FIG. 9A.
Figure 2C:
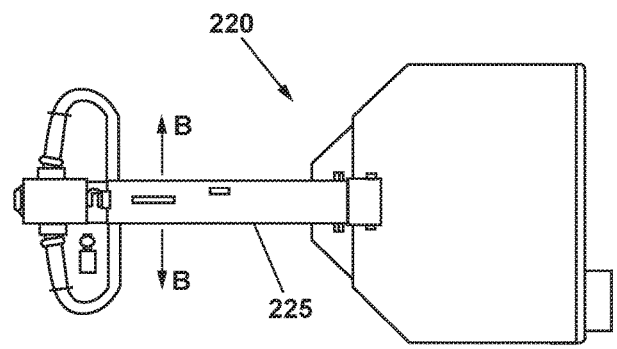
FIG. 2C is a top plan view of the cart mover of FIG. 9A.
Figure 3:
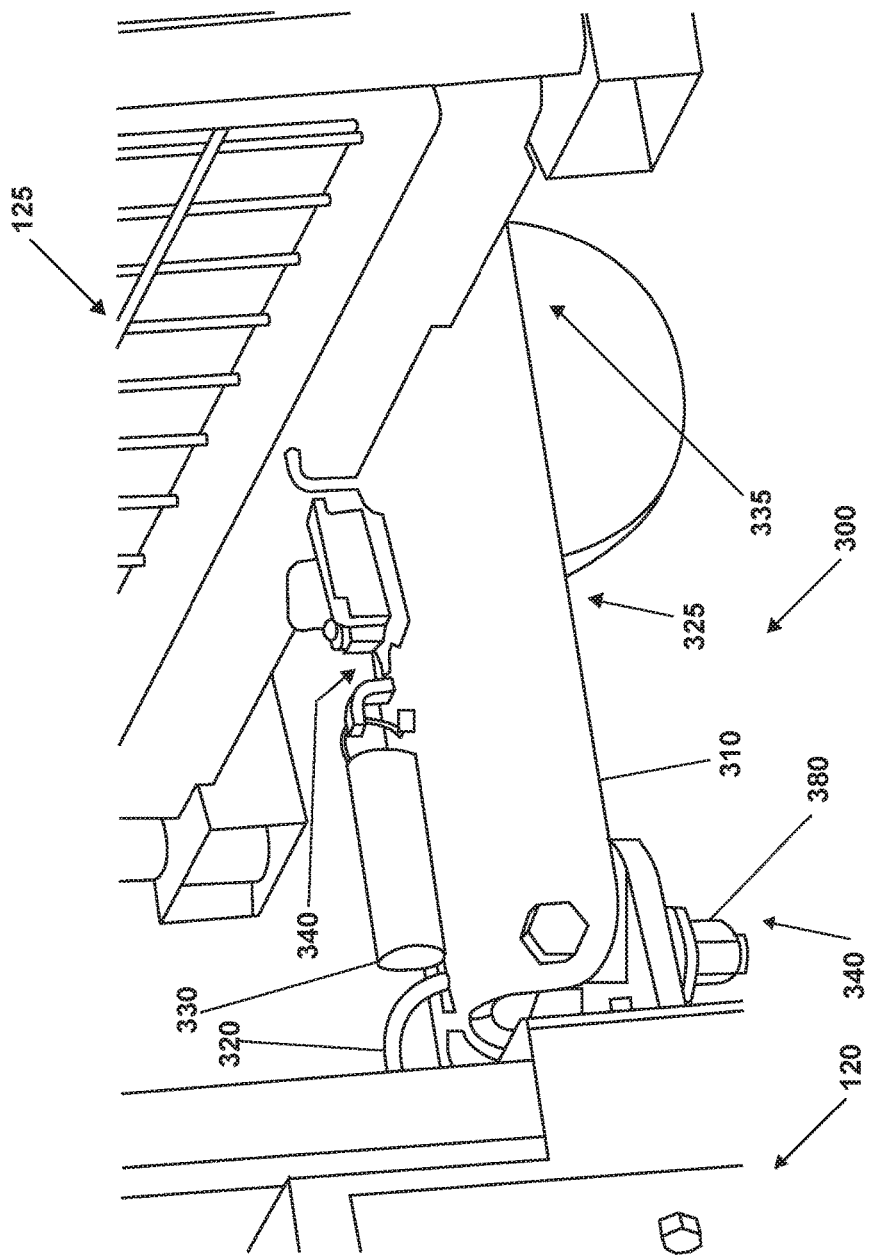
FIG. 3 is an enlarged side isometric view of a hitch assembly shown coupled to a cart and a cart mover according to one embodiment of the present disclosure.

The cart mover 120 may be any type of cart mover, including a cart pulling device or a cart pushing device. In one embodiment, the mover 120 may be a battery-powered, mechanical cart pulling machine. In some embodiments, the mover 120 may include steerable tillers and a front wheel connected thereto. FIGS. 2A-2C, illustrate rear isometric, side, and top plan views of another embodiment of a mover 220. The mover 120 may include a fixed tiller assembly 225 and a swivel caster wheel 230. In use, the fixed tiller assembly 225 can move, or rotate, in a vertical direction, for example, in the direction of arrows A in FIG. 2B, but may not move in a generally horizontal direction, for example, in the direction of arrows B of FIG. 2C.

FIGS. 3-6 illustrate one embodiment of a hitch assembly including a rotating hitch stop. The hitch assembly 300 may generally include a rotating hitch stop 305, an elongated body 310, catch members 315, and a control assembly, including a control cable 320 and a mechanical arrangement 325 enclosed within the body 310 and which is discussed in further detail below. In one embodiment, the hitch assembly 300 may also include a biasing member 330.

The elongated body 310 includes a cart end 335 and a mover end 340. The cart end 330 of the elongated body 310 may be releasably coupled to a cart 125. In one embodiment, the elongated body 310 is generally rectangular in shape with a partially sloped cart end 345 configured to engage a cart 125. In alternative embodiments, the elongated body 310 may be cylindrical or other suitable shape appropriate to engage a cart 125 and a mover 120. The elongated body 310 may be constructed of stainless steel, aluminum, plastic, or other suitable material with strength appropriate for the weight of the load, or any combination thereof. The cart end 335 of the body 310 may include a cart face 350 and catch members 315. In one embodiment, the cart face 350 of the cart end 335 of the body 10 may be partially sloped and may generally be configured so as to not hinder a cart 125 from engaging the catch members 315 and the rotating hitch stop 305. In some embodiments, the cart face 350 may be configured to engage a cart 125.

Figure 5A:
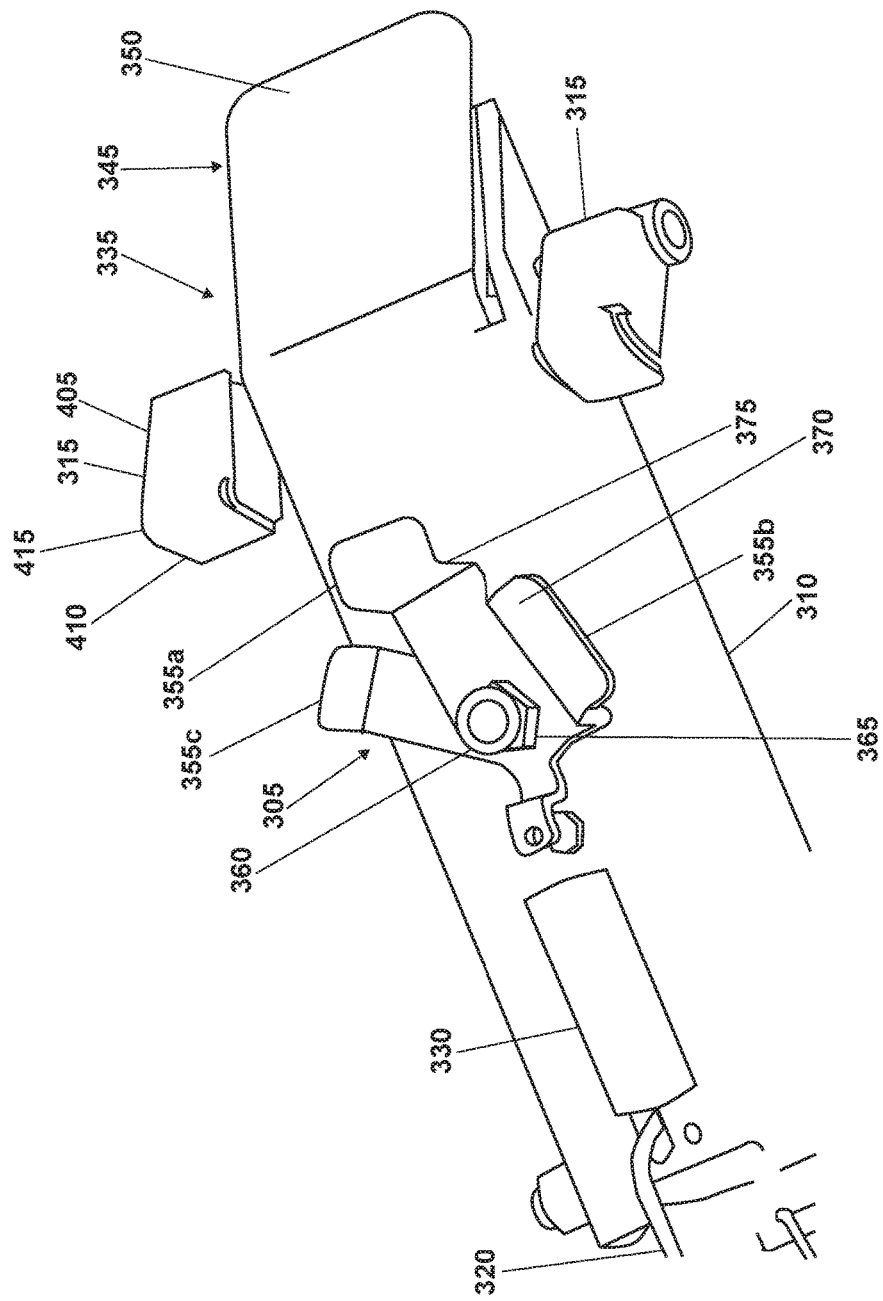
FIG. 5A is a partial top isometric view of the hitch assembly of FIG. 4, wherein a hitch stop is shown in a first position.
Figure 5B:
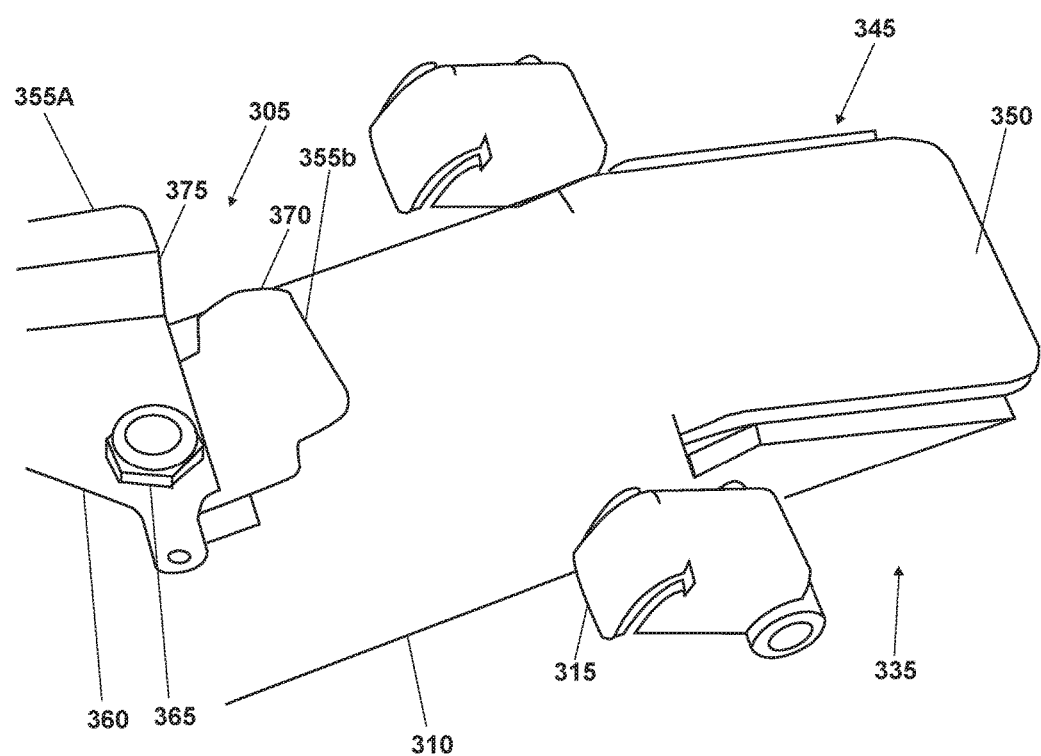
FIG. 5B is a partial top isometric view of the hitch assembly of FIG. 4, wherein the hitch stop is shown in a second position.
Figure 5C:
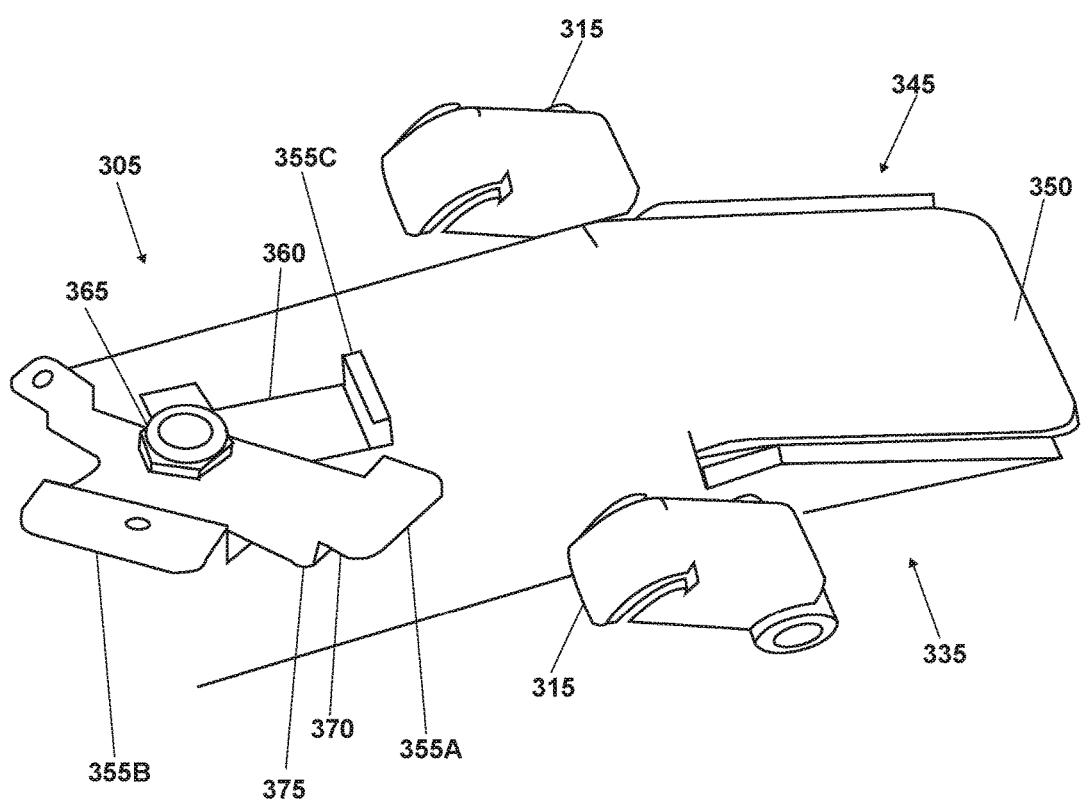
FIG. 5C is a partial top isometric view of the hitch assembly of FIG. 4, wherein the hitch stop is shown in a third position.

As shown particularly in FIGS. 5A-C, in one embodiment, the rotating hitch stop 305 may include flanges 355, a plate 360, and a fastening member 365. The rotating hitch stop 305 may rotate in a horizontal plane about the fastening member 365 to engage and stop a cart 125. Particularly, the rotating hitch stop 305 may be pivotally coupled to the elongated body 310 via the fastening member 365. The stop 305 may also be operably coupled to a biasing member 330. The fastening member 365 may be a screw, a bolt, or other suitable mechanical fastener or combination of fasteners. The fastening member may further include a washer. The rotating hitch stop 305 may be constructed of stainless steel, aluminum, plastic, or other suitable material with strength appropriate for the weight of the load, or any combination thereof.

As can be understood from FIGS. 5A-C, in one embodiment, the rotating hitch stop 305 may be rotated about the fastening member 365 and engage a cart 125 from one of three different positions with one of three different flanges 355a, 355b, 355c. The flanges 355 may vary in height, width, and length from the fastening member 365, in order to accommodate various types of carts 125. The flanges 355 may also vary in shape and may include a horizontal portion 370 in addition to a vertical portion 375 to abut or engage a vertical wall of the cart 125, for example, at a lip or hitch engagement feature of the floor 140 of the cart. The flanges 355 may increase efficiency because multiple types of carts 125 may be coupled to a mover 120 utilizing a single rotating hitch stop 305. While a rotating hitch stop 305 having three different flanges 355 is illustrated, it is recognized that the rotating hitch stop 305 may include a suitable number of two or more flanges 355 as may be deemed desirable.

In one embodiment, the biasing member 330 may be a spring, spring-like device, or the like. The biasing member 330 may be operably connected to the elongated body 310 and to the rotating hitch stop 305. The biasing member 330 may provide tension to the stop 305, such that the stop 305 may engage a cart 125 and hinder the progress of the cart 125 towards the cart mover 120. In one embodiment, the biasing member 330 can maintain flange 355a of the rotating hitch stop 305 in a first position (e.g., FIG. 5A) for engagement with the cart 125, while not hindering the selection of other flanges 355b, 355c. That is, the rotating hitch stop 305 may be rotated into, for example, a second or third position, such that flanges 355b, 355c, respectively, may be positioned for engagement with the cart 125 as needed. In some embodiments, the rotating hitch stop 305 may further include a detent mechanism for selecting and maintaining a flange 355 in its respective position for engagement with the cart 125.

The mover end 340 of the elongated body 310 may be operably or pivotally coupled to a cart mover 120 via fastening members 380 and the control assembly. The fastening members 380 may be screws, bolts, or other suitable mechanical fasteners, or combinations thereof. The hitch assembly 300 may pivot about one of the fastening members 380 in a vertical plane and about another fastening member 380 in a horizontal plane. With specific reference to FIG. 6, the mover 120 may include a spring assembly 600 operably coupled to the mover end 340 of the elongated body 310 of the hitch assembly 300. The spring assembly 600 may provide a control mechanism for the horizontal rotation of the hitch assembly 300 about fastening member 380a and generally does not hinder the vertical rotation of the assembly 300 about fastening member 380b, as described in more detail below.

In use, in one embodiment, when the mover end 340 of the elongated body 310 of the hitch assembly 300 is coupled to the mover 120, the spring assembly 600 can bias the hitch assembly 300 to generally align longitudinally with the mover 120. The hitch assembly 300 may rotate in a horizontal plane about fastening member 380a to allow the assembly 300 and a cart 125 to turn and generally move during transport of the cart 125. The spring assembly 600 can be biased to return the hitch assembly 300 to a generally longitudinally aligned position following a turn.

In one embodiment, when not in use and when a cart 125 is not coupled to the mover 120, the assembly 300 may be placed in a storage position on the mover 120. Particularly, in one embodiment, the hitch assembly 300 may rotate in a vertical plane in a direction illustrated by arrows C, about fastening member 380b, thereby allowing the assembly 300 to "fold up" or "fold into" the mover 120 in a storage position. To remove the assembly 300 from the storage position, the previously described process can be reversed. That is, the hitch assembly 300 may rotate in a vertical plane in a direction illustrated by arrows C, about fastening member 380b, thereby allowing the assembly 300 to come out of the storage position. While the spring assembly 600 may bias to some extent during vertical rotation, the spring assembly 600 can be configured such that it does not substantially hinder the vertical rotation of the hitch assembly 300.

Figure 4:
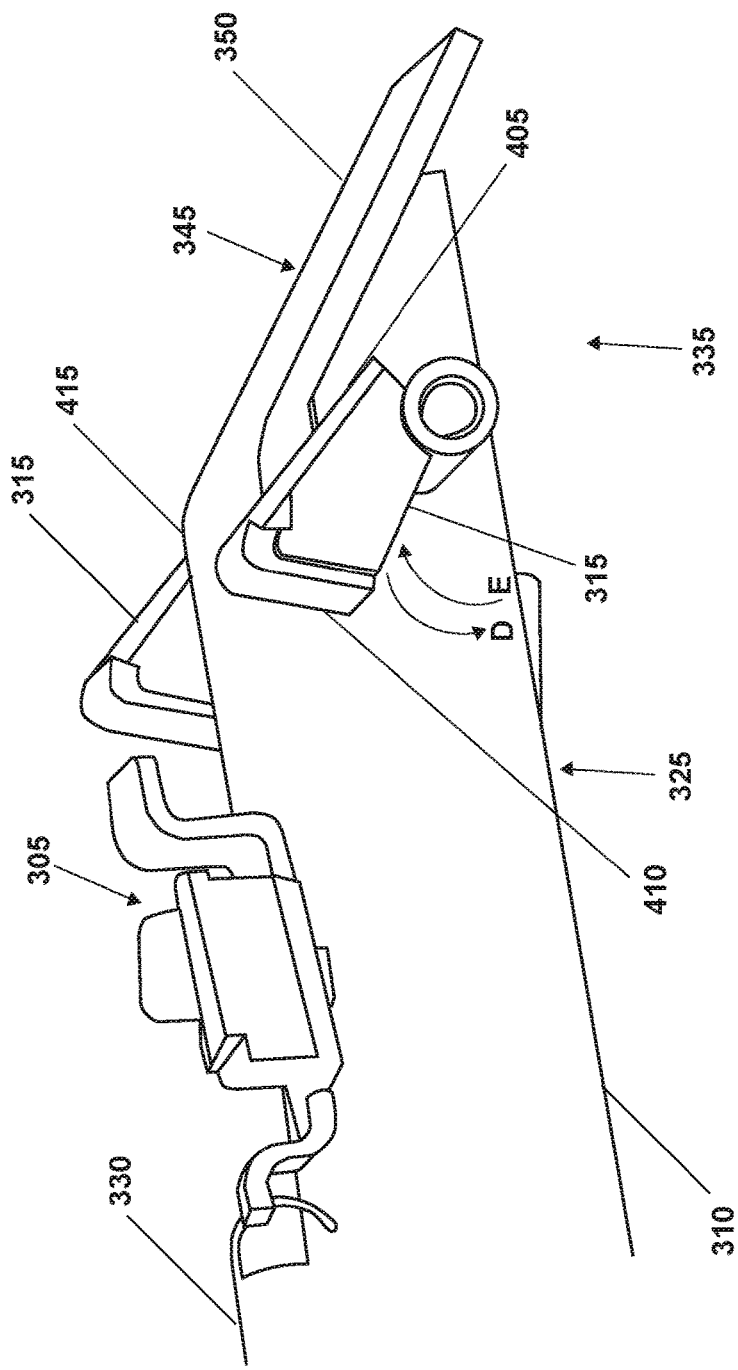
FIG. 4 is a partial side isometric view of the hitch assembly of FIG. 3, wherein the cart and cart mover are hidden for clarity purposes.

With particular reference to FIGS. 4 and 5A, the catch members 315 may include a first face 405 and a second face 410. The faces 405, 410 may be connected by a rounded or curved edge 415. Depending upon the configuration of the cart 125, none, some, or all of the faces 405, 410, and edge 415 may contact the cart 125.

Figure 6:
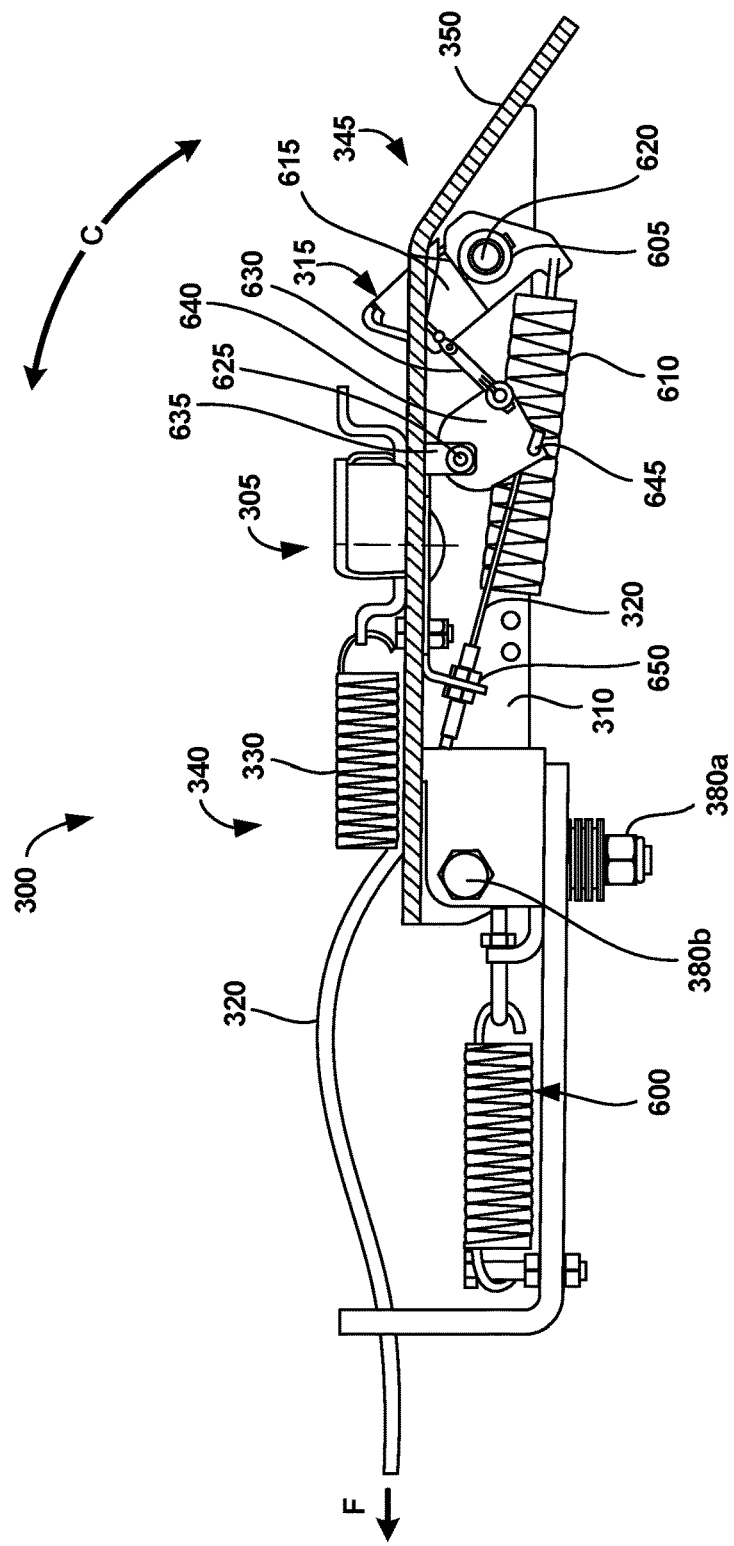
FIG. 6 is a cross-sectional view of the hitch assembly of FIG. 3, wherein the cart and cart mover are hidden for clarity purposes.
Figure 7:
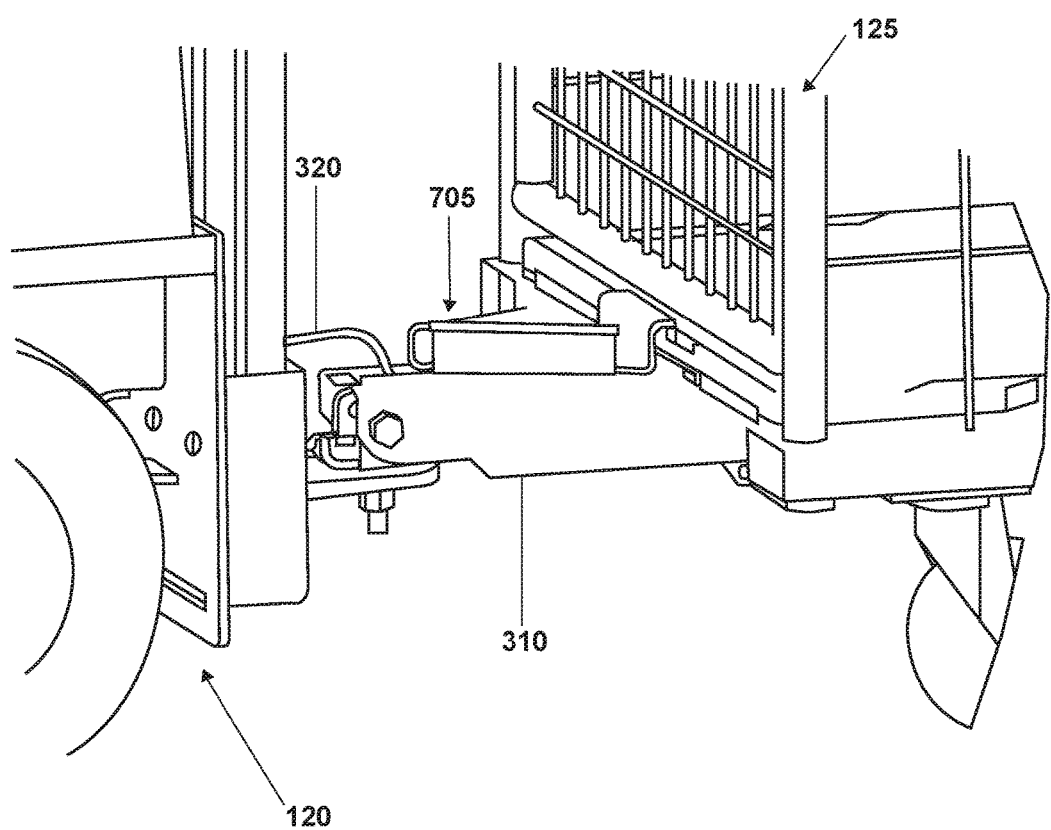
FIG. 7 is an enlarged side isometric view of a hitch assembly shown coupled to a cart and a cart mover according to another embodiment of the present disclosure.
Figure 8:
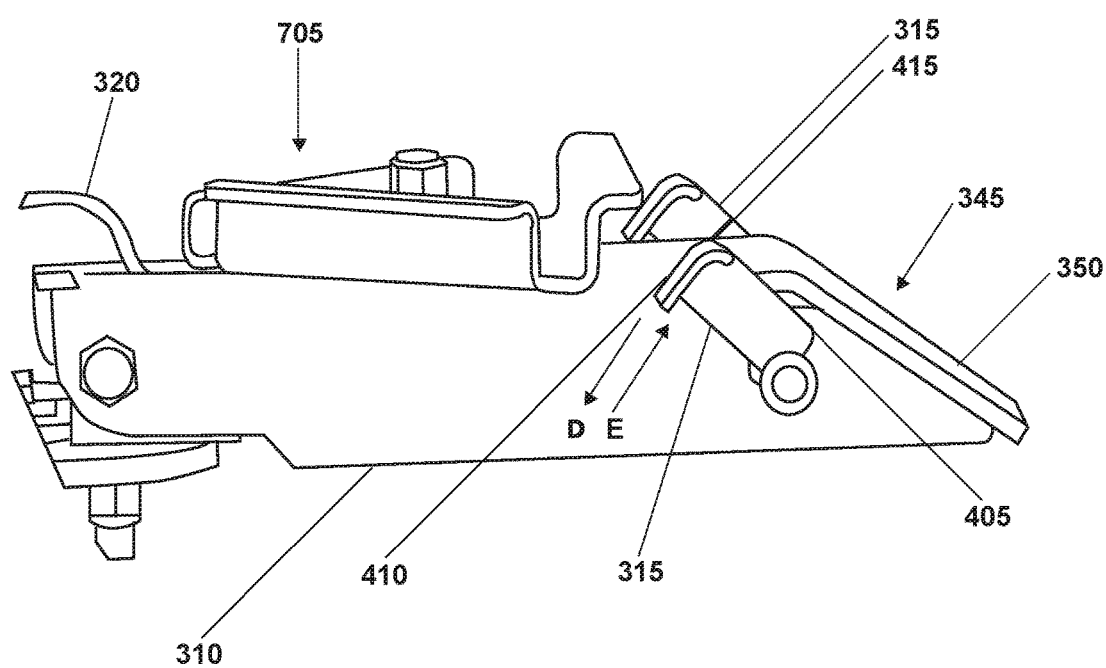
FIG. 8 is a partial side isometric view of the hitch assembly of FIG. 7, wherein the cart and cart mover are hidden for clarity purposes.

As indicated particularly in FIG. 6, each catch member 315 may include a pivot point 605, a spring 610, and a catch member tab 615, which, along with the cable 320, can form part of the control assembly. The release or disengagement of the catch members 315 can be controlled via the control assembly. The catch members 315 may be pivotally coupled to the body 310 via their respective catch member tab 615, which may receive, in a pivotal configuration, a rod 620 that extends through the pivot points 605 and the body 310. The catch members 315 may each be coupled to their respective spring 610 via the catch member tab 615, and the opposite end of each spring 610 may be coupled to the body 310. In one embodiment, the catch members 315 may pivot in unison. In other embodiments, the catch members 315 may not pivot in unison. In one embodiment, there are two catch members 315. However, in other embodiments, there may be fewer or greater catch members 315. The catch members 315 may be constructed of stainless steel, aluminum, plastic, or other suitable material with strength appropriate for the weight of the load, or any combinations thereof. Each member 315 may have its own dedicated spring 610 or, alternatively, in some embodiments, a single spring 610 may bias both catch members 315.

As can be understood from FIG. 6, in some embodiments, along with cable 320, the control assembly may further include a pivot rod 625, a linkage 630, a tab 635, a rotating plate 640, a cable connective end 645, and/or a coupling member 650. A first end of the cable 320 may be operably coupled to a lever of the mover 120, and the opposite end of the cable 320 may include the connective end 645 that couples the second end of the cable 320 to the rotating plate 640. The sheath of the cable 320 may be coupled via the coupling member 650 to the body 310, such that the inner cable portion can displace relative to the cable sheath when the lever on the mover 120 is displaced. The rotating plate 640 may be pivotally coupled to the elongated body 310 via the pivot rod 625 extending through the tab 635 of the body 310. The rotating plate 640 may be further coupled to the linkage 630, and the linkage 630 may be coupled to a catch member tab 615. In use, and as described in more detail below, the control assembly can control the coupling and release of the catch members 315 to a cart 125.

As can be understood from FIGS. 3-6, the catch members 315 may pivot about their pivot points 605 in a vertical plane to engage a cart 125 and hinder the movement of the cart 125 once engaged. As a cart 125 is brought into engagement with the hitch assembly 300 and over the catch members 315, the framework or other aspect of the cart 125 being engaged may press against the catch members 315 to cause the catch members 315 to pivot or rotate about the pivot points 605 and pivot rod 620 in direction D, and thereby extending the spring 610 until the cart 125 abuts the rotating hitch stop 305. Once the framework or other aspect of the cart 125 clears the catch members 315, the spring 610 may bias the catch members 315 such that the members 315 pivot or rotate in direction E to engage the floor 140 or the lip or hitch engagement feature of the cart 125.

To disengage the catch members 315 from the cart 125, a lever of the cart mover 120 may be used or engaged to displace the cable 320 of the control assembly, pulling the cable 320 in direction F. As the cable 320 is pulled, the rotating plate 640 can be caused to pivot in a clockwise direction about the pivot rod 625 on the tab 635. As the rotating plate 640 pivots, the linkage 630 follows, thereby pulling a catch member 315 or catch members, via the catch member tab 615, in direction D and thereby disengaging the catch members 315 from the cart 125. The cart 125 may also be disengaged from the rotating hitch stop 305. Once disengaged from the catch members 315 and the hitch stop 305, the cart 125 may be removed from the hitch assembly 300, the lever of the cart may be released, the above described process will be reversed, and the spring biased catch members 315 can bias into their original positions.

FIGS. 7-10, illustrate another embodiment of a rotating hitch stop 705. The rotating hitch stop 705 may include flanges 755, a plate 760, and a fastening member 765. The rotating hitch stop 705 may rotate in a horizontal plane about the fastening member 765 to engage and stop a cart 125. The rotating hitch stop 705 may be pivotally coupled to the elongated body 310 via the fastening member 765. The fastening member 765 may be spring-loaded or fixed, may be a screw, a bolt, or other suitable mechanical fastener or combinations thereof, and may be a part of a detent mechanism. The rotating hitch stop 705 may be constructed of stainless steel, aluminum, plastic, or other suitable material with strength appropriate for the weight of the load, or any combinations thereof.

Figure 9A:
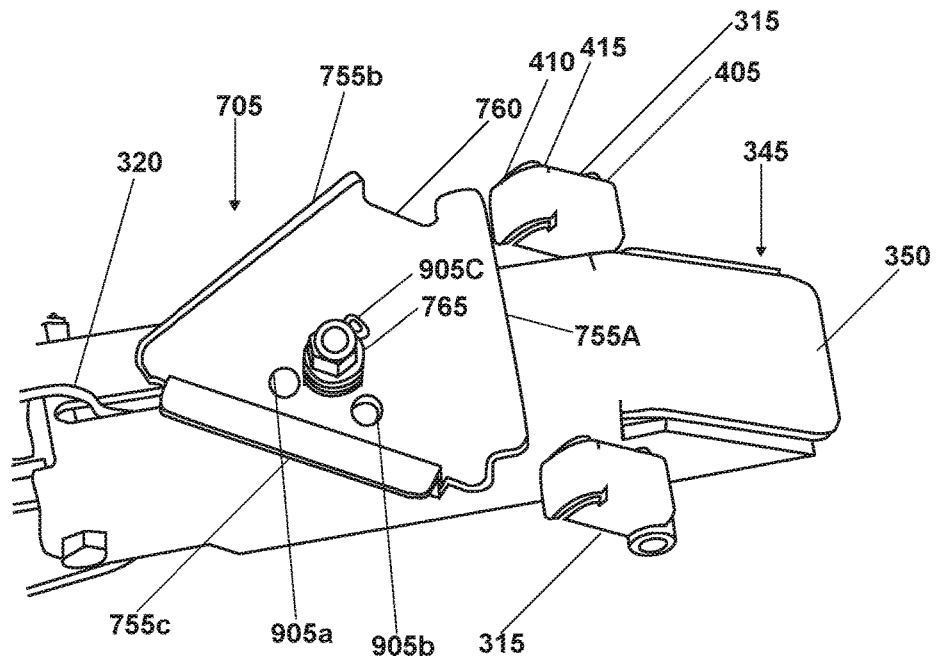
FIG. 9A is a partial top isometric view of the hitch assembly of FIG. 8, wherein the hitch stop is shown in a first position.
Figure 9B:
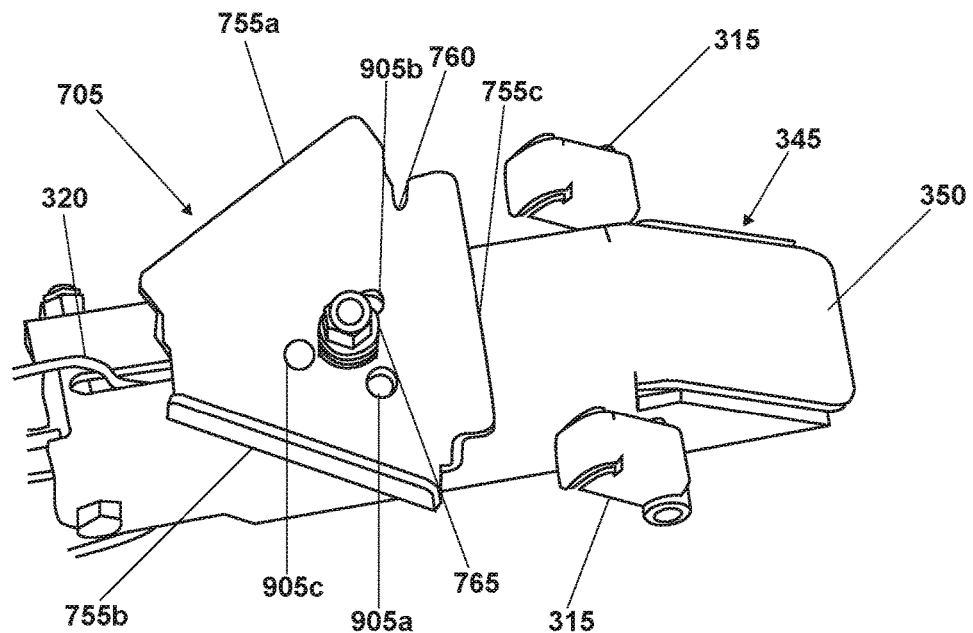
FIG. 9B is a partial top isometric view of the hitch assembly of FIG. 8, wherein the hitch stop is shown in a second position.
Figure 9C:
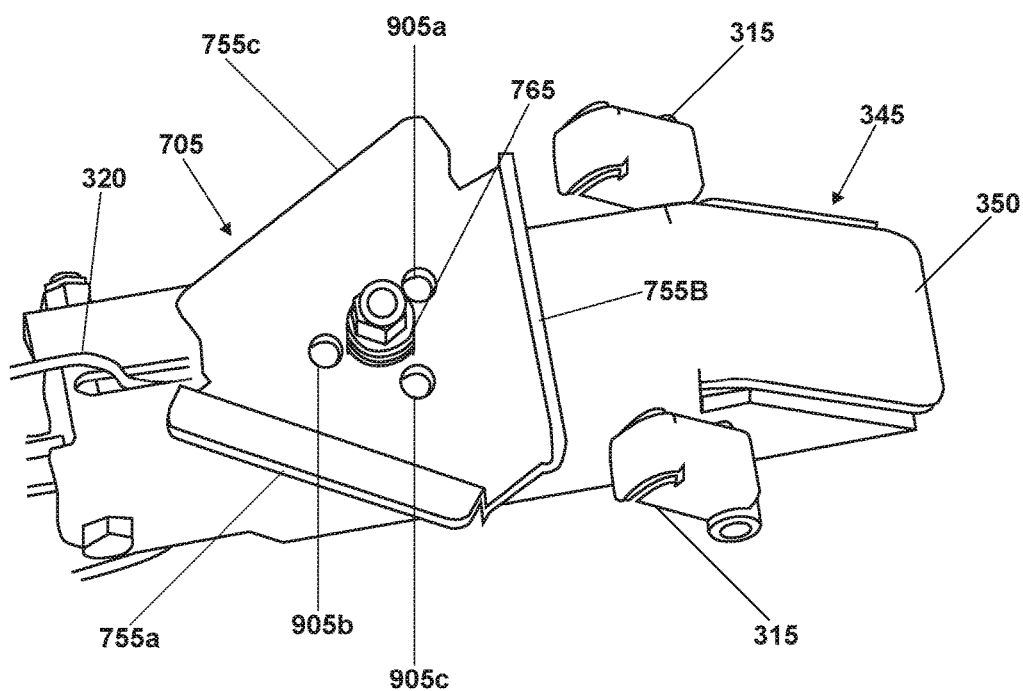
FIG. 9C is a partial top isometric view of the hitch assembly of FIG. 8, wherein the hitch stop is shown in a third position.
Figure 10:
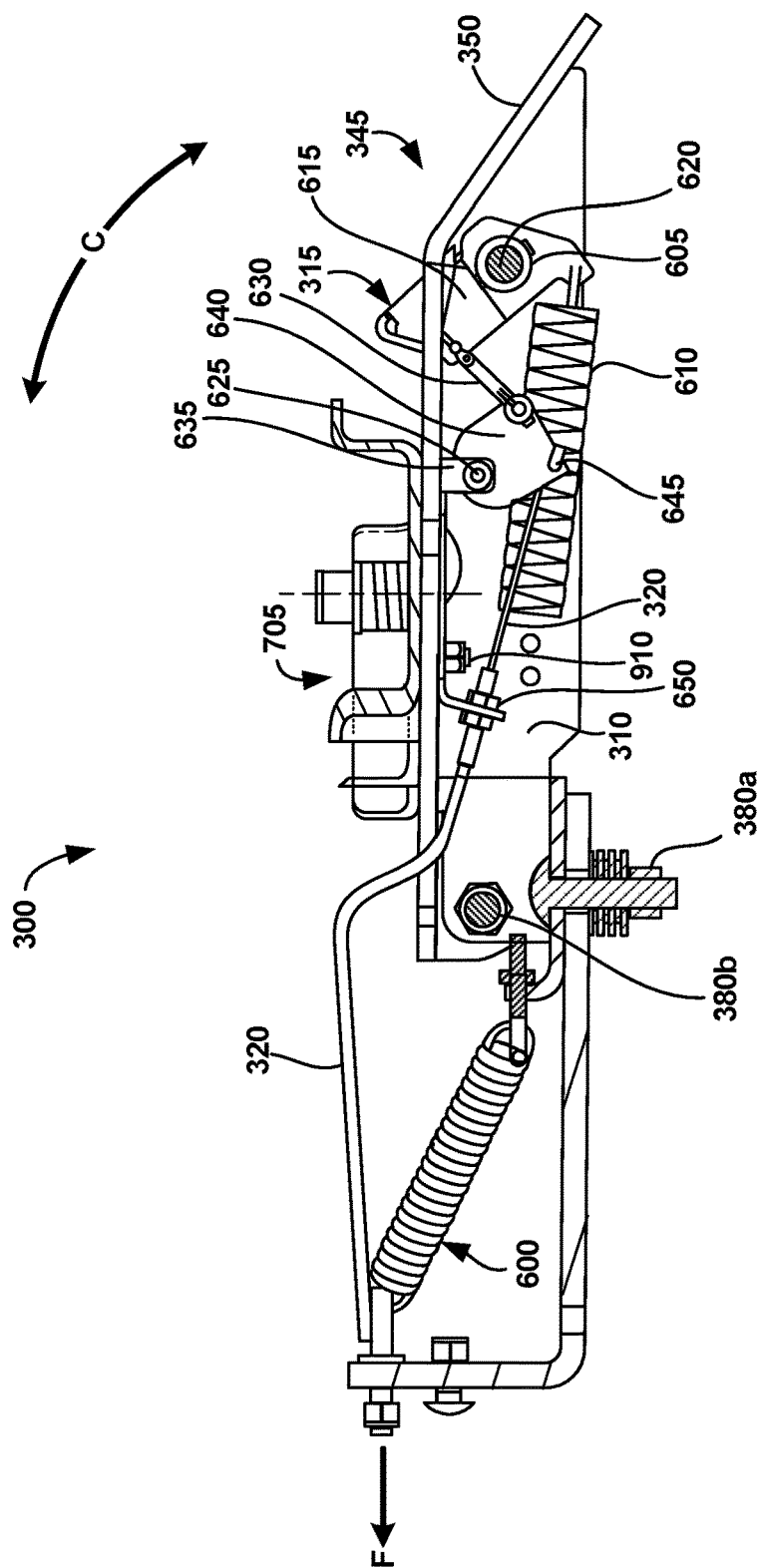
FIG. 10 is a cross-sectional view of the hitch assembly of FIG. 7, wherein the cart and cart mover are hidden for clarity purposes.

As shown in FIGS. 9A-C, in one embodiment, the plate 760 may include at least three holes 905. However, in other embodiments, the plate 760 may include greater or fewer than three holes. In some embodiments, the holes 905, form the corner points for a generally triangular shape about the fastening member 765. As will be recognized, in other embodiments, the holes 905 may form a different shape about the fastening member 765, such as a circle or other round or polygonal shape. In some embodiments, the shape formed by the holes 905 may vary depending on the number of holes 905 provided.

As can be understood from FIGS. 9A-C, in one embodiment, the rotating hitch stop 705 can rotate about the fastening member 765. As described in more detail below, a spring-loaded fastening member 765 can press down on the rotating hitch stop 705 while still allowing the hitch stop 705 to be rotated, such that a hole 905 may align with a fixed fastening member 910 (see FIG. 10), forming a detent arrangement. In other embodiments, the fastening member 765 may be fixed and the fastening member 910 may be spring loaded.

As illustrated in FIGS. 9A-C, the flanges 755 vary in height, width, and length from the fastening member 765, in order to accommodate various types of carts 125. The flanges 755 may also vary in shape and may include a horizontal portion 770 in addition to a vertical portion 775 to abut or engage a vertical wall of the cart 125. The rotating hitch stop 705 may be rotated about the fastening member 765 until a hole 905 engages the fastening member 910. Each hole 905 may correspond to one of the flanges 755. For example, a hole 905a, 905b, 905c may be engaged by the fastening member 910 when its respective flange 755a, 755b, 755c is in position for engagement with a cart 125, for example, at a lip or hitch engagement feature of the floor 140 of the cart. The flanges 755 may increase efficiency because multiple types of carts 125 may be coupled to a single mover 120 utilizing a single rotating hitch stop 705. While a rotating hitch stop 705 having three different flanges 755 is illustrated, it is recognized that the rotating hitch stop 705 may include a suitable number of two or more flanges 755 as may be deemed desirable.

In some embodiments, the rotating hitch stop 705 may include a detent mechanism, such as the fastening member 910, for selecting and maintaining a flange 755 in a position for engagement with a cart 125. As described above, each hole 905 can be configured to receive the fastening member 910, such that during the rotation of the hitch stop 705, a hole 905 may align with the fastening member 910. When aligned, the fastening member 910 can engage the hole 905, thereby hindering or stopping the rotation of the hitch stop 705 about the fastening member 765 and thereby presenting a respective flange 755 to engage a cart 125. However, in other embodiments, the fastening member 765 may be spring-loaded or the like and may provide enough tension when biased against the plate 760, such that the fastening member 765 hinders or stops the rotation of the hitch stop 705 about the fastening member 765 and thereby presents a respective flange 755 to engage a cart 125. In such embodiments, holes 905 and fastening member 910 may be eliminated.

Figure 11:
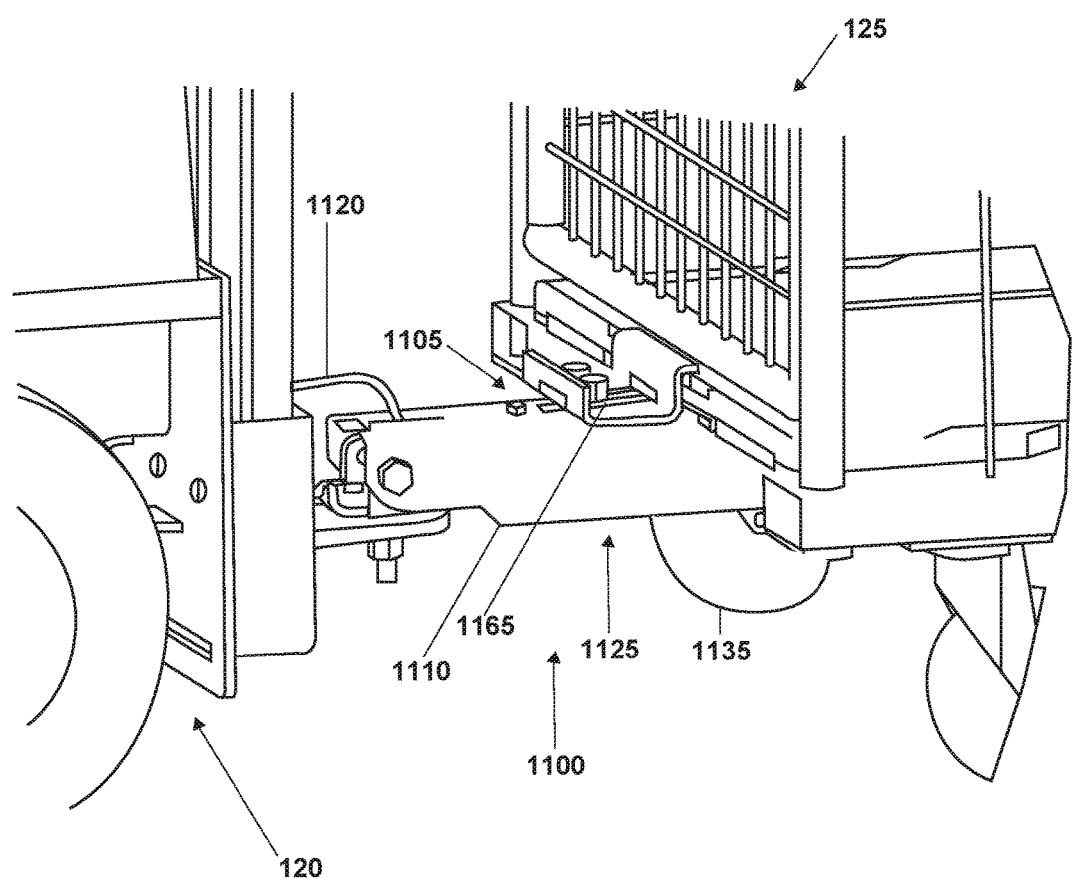
FIG. 11 is an enlarged side isometric view of a hitch assembly shown coupled to a cart and a cart mover according to yet another embodiment of the present disclosure.
Figure 12A:
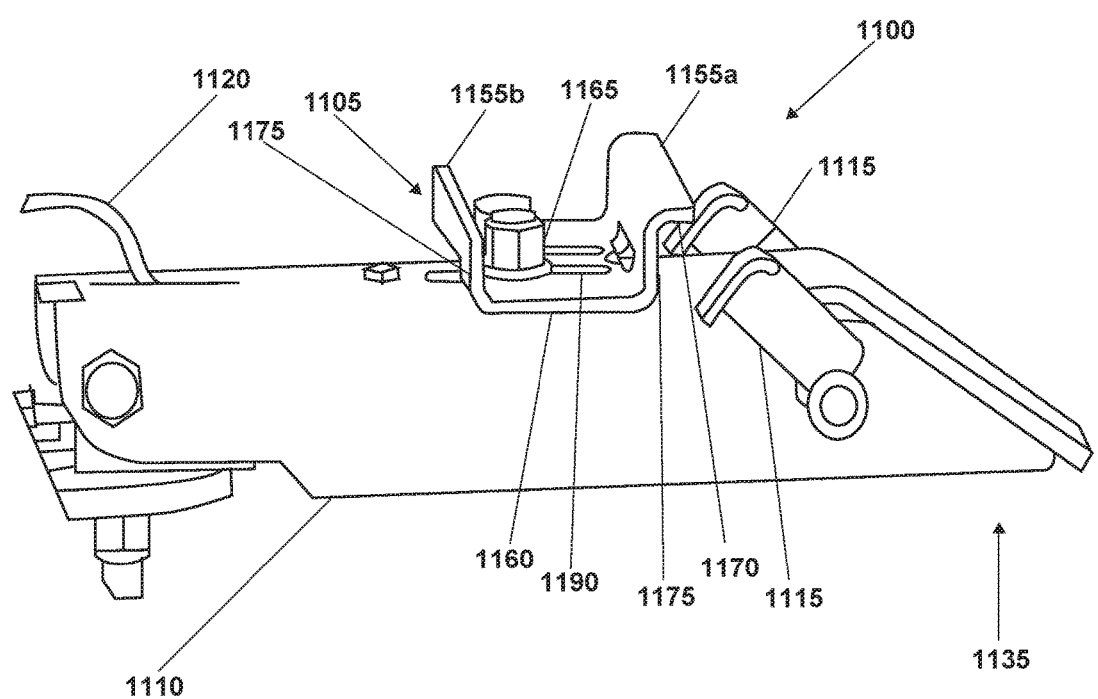
FIG. 12A is a partial side isometric view of the hitch assembly of FIG. 11, wherein the cart and cart mover are hidden for clarity purposes.
Figure 12B:
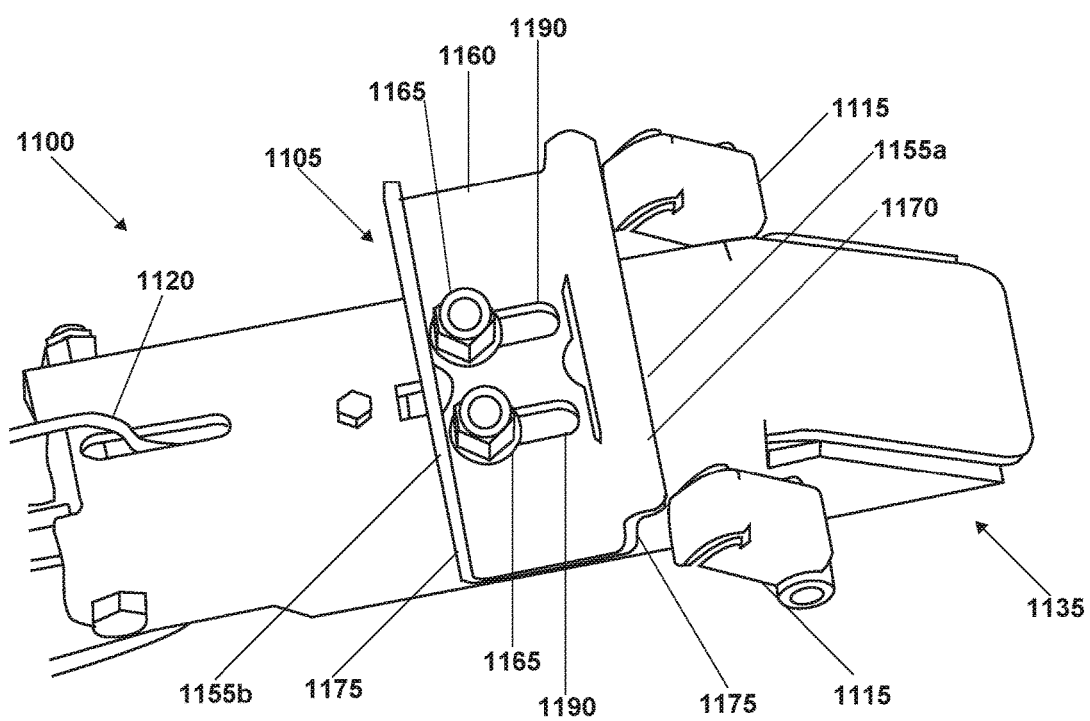
FIG. 12B is a partial top isometric view of the hitch assembly of FIG. 12A.
Figure 13:
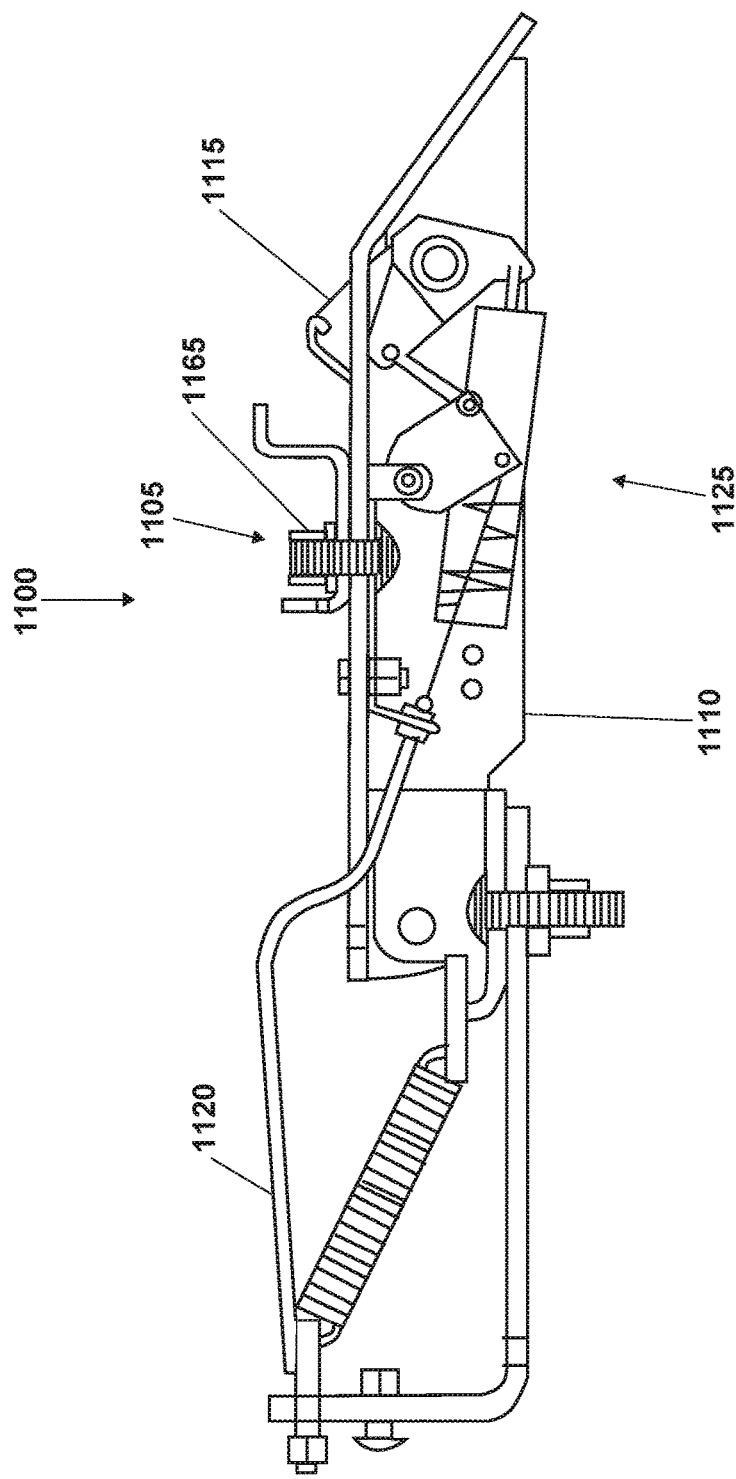
FIG. 13 is a cross-sectional view of the hitch assembly of FIG. 11, wherein the cart and cart mover are hidden for clarity purposes.

FIGS. 11-13 illustrate another embodiment of a hitch assembly 1100 including a sliding hitch stop 1105. In some embodiments, the hitch assembly 1100 may include a sliding hitch stop 1105, an elongated body 1110, catch members 1115, and a control assembly, including a control cable 1120 and a mechanical arrangement 1125 enclosed within the body 1110. The catch members 1115 and the control assembly, including the control cable 1120 and the mechanical arrangement 1125 enclosed within the body 1110, may be generally similar to and generally operate similar to the catch members 315 and the control assembly discussed above with respect to FIGS. 3-10. Similarly, the elongated body 1110 may be generally similar to and generally operate similar to the elongated body 310 as described above with respect to FIGS. 3-10, except the elongated body 1110 of the hitch assembly 1100 may include a sliding hitch stop 1105 and may include holes configured to accept sliding fastening members 1165, as described in more detail below.

The sliding hitch stop 1105 may include sliding fastening members 1165, flanges 1155, and a plate 1160 having slots 1190. The sliding hitch stop 1105 may slide in a generally horizontal plane via the slots 1190 about the sliding fastening members 1165 to engage and stop a cart 125. The sliding hitch stop 1105 may be slidingly coupled to the elongated body 1110 via the fastening members 1165. The plate 1160 may include slots 1190 configured to receive and slidingly engage the fastening members 1165. The fastening members 1165 may be screws, bolts, or other suitable mechanical fasteners, or combinations thereof. The sliding hitch stop 1105 may be constructed of stainless steel, aluminum, plastic, or other suitable material with strength appropriate for the weight of the load, or any combinations thereof.

As shown particularly in FIGS. 12A and 12B, in one embodiment, flange 1155a may vary in shape and may include a vertical portion 1175 and a horizontal portion 1170. Flange 1155b may include a vertical portion 1175. In other embodiments, flanges 1155a, 1155b may include both vertical and horizontal portions or only vertical portions, or may be shaped in any other suitable or desirable configuration for engagement with a cart 125. Flanges 1155 may engage a cart 125, and as part of the hitch stop assembly 1105, may hinder the cart's forward progress.

In use, the sliding hitch stop 1105 may slidingly adjust such that the distance between flange 1155a, for example, and the cart end 1135 of the elongated body 1110 may vary. Such variability allows the hitch stop 1105 to accommodate carts 125 with varying floor shapes, configurations, and sizes. The hitch stop 1105 may increase efficiency because multiple types of carts 125 may be coupled to a single mover 120 utilizing the hitch stop 1105.

Figure 14A:
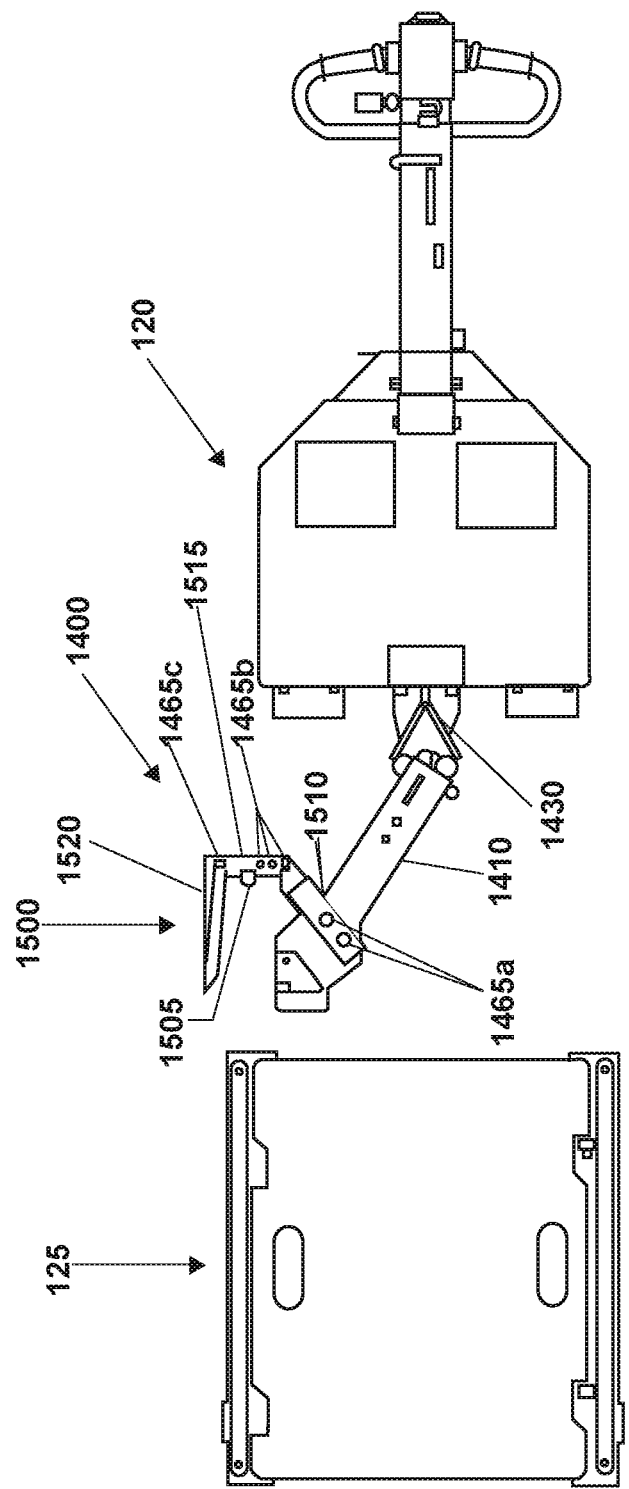
FIG. 14A is a top plan view of a hitch assembly, shown coupled to a cart mover, and de-coupled from the cart according to a further embodiment of the present disclosure.
Figure 14B:
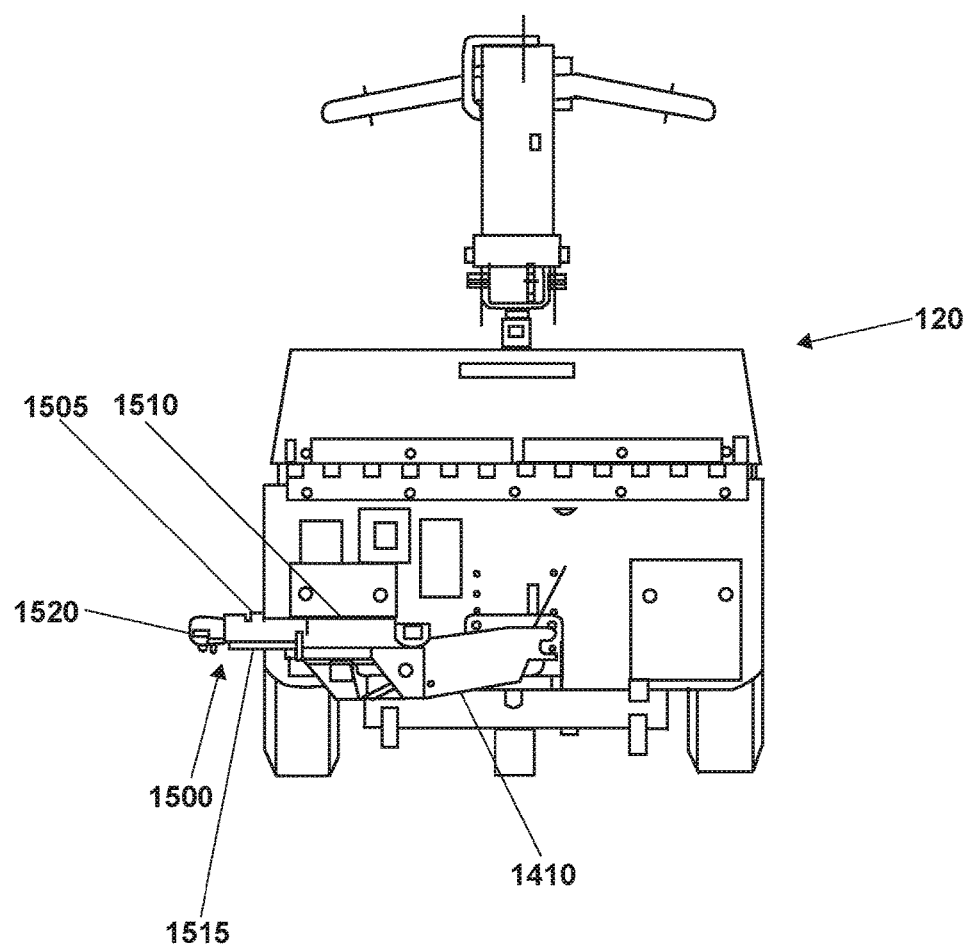
FIG. 14B is a rear view of the hitch assembly and mover of FIG. 14A, wherein the cart is hidden for clarity purposes.
Figure 15A:
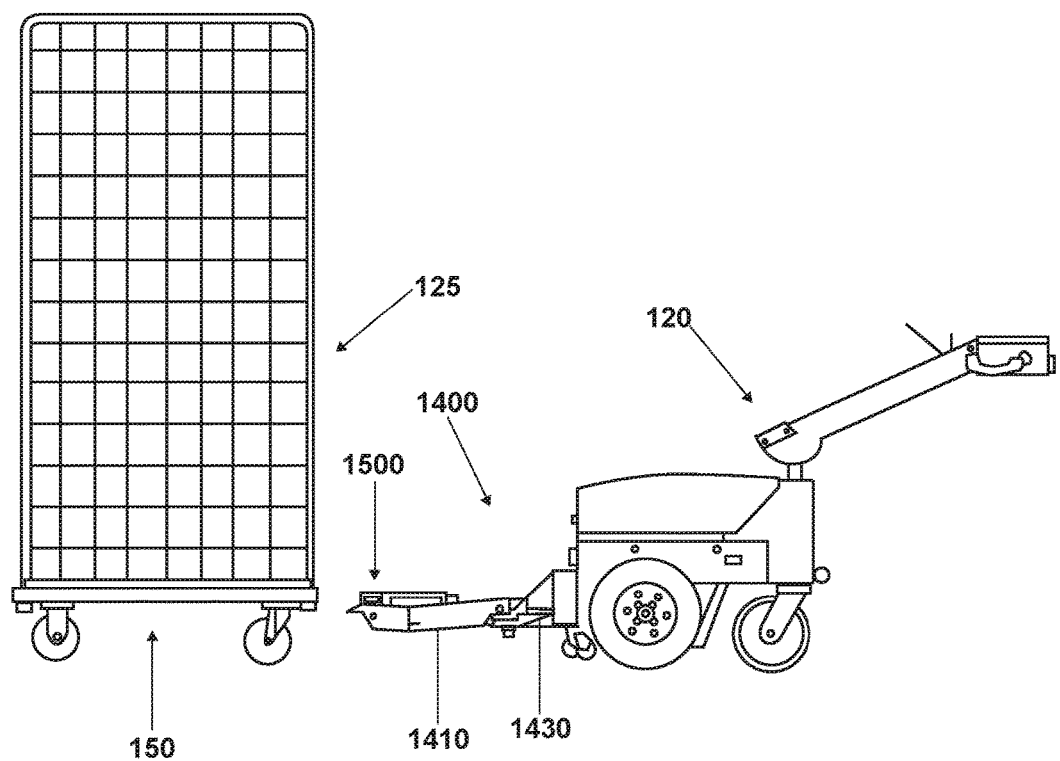
FIG. 15A is a side view of the hitch assembly, cart mover, and cart of FIG. 14A.
Figure 15B:
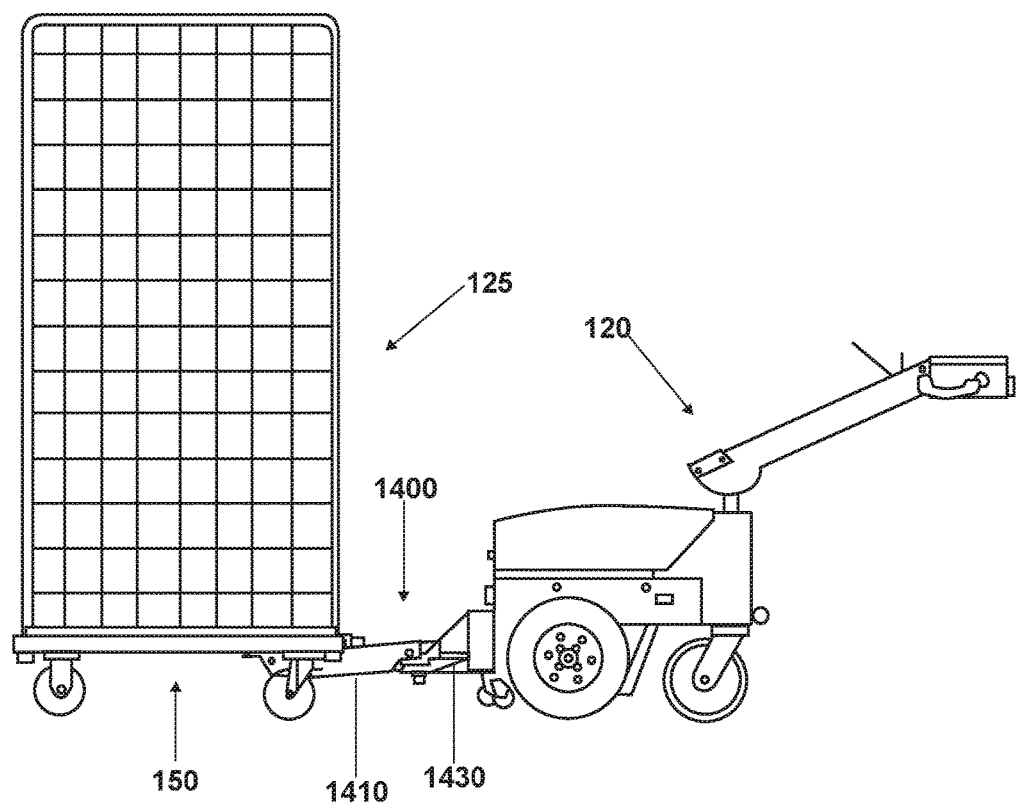
FIG. 15B is a side view of the hitch assembly, cart mover, and cart of FIG. 14A, wherein the hitch assembly is coupled to the cart.

As discussed above, in some embodiments, a hitch assembly may include a swinging or rotating latch end. FIGS. 14-17F illustrate another embodiment of a hitch assembly 1400, including a swinging or rotating latch end 1500, which may also be referred to herein as a hitch stop. As illustrated in FIG. 14A, in some embodiments, the hitch assembly 1400 may include an elongated body 1410, biasing attachment members 1430, and a rotating or swinging latch end or hitch stop 1500. The swinging latch end 1500 of the hitch assembly 1400 may also include fastening members 1465a, a tab 1505, an elongated body end 1510, a middle portion 1515, and a hook end 1520. The fastening members 1465a may be bolts, pivot bolts, screws, or the like. The tab 1505, the elongated body end 1510, the middle portion 1515, and the hook end 1520 may be made of material similar to that of the elongated body 1410.

The elongated body end 1510 may be pivotally coupled to the elongated body 1410 via fastening members 1465a. The elongated body 1405 may include slotted openings 1490 (see FIG. 17B) configured to receive the fastening members 1465a, such that the rotating latch end 1500 and the elongated body 1400 may be operably or pivotally coupled. The middle portion 1515 may be operably coupled to the elongated body end 1510 via at least one of fastening members 1465a and 1465b, and the hook end 1520 may be operably coupled to the middle portion 1515 via at least one of fastening members 1465b and 1465c. The rotating latch end 1500 may be separate, individual pieces or sections coupled via fastening members or other coupling methods, such as but not limited to welding, or may be a single continuous piece or may be a combination of individual and continuous pieces.

As can be understood from FIGS. 15A-16D, the hitch assembly 1400 coupled to the cart mover 120 may be placed into position such that the hitch assembly 1400 may begin engagement with the frame 150 of a cart 125. As further shown particularly in FIGS. 15B-16D, and discussed in more detail below, the hitch assembly 1400 may engage the frame 150, thereby generally securing the cart 125 to the cart mover 120. The cart 125 may now be moved via the cart mover 120. As discussed in more detail below, the swinging latch end 1500 may be subsequently disengaged from the cart frame 150, thereby releasing the cart 125 from the cart mover 120. A hitch assembly 1400 that is coupled to the frame 150 of a cart 125 may be able to pull additional carts or additional weight and is not affected by items that may be on the floor 140 of the cart and further is not affected by the size or shape of the floor 140.

As shown in FIGS. 14A-16D and detailed in FIGS. 17A-F, the hitch assembly 1400 may include a mover attachment plate 1705, one or more biasing members 1430, a rotating or swinging latch end 1500, fastening members 1465, a cart engagement ramp 1745, an elongated body 1410, and a control assembly. The mover attachment plate 1705 may pivotally couple the hitch assembly 1400 to a mover 120 via biasing members 1430 and fastening members 1780a, 1780b. The biasing members 1430 may be, but are not limited to, springs, spring-like devices, or the like, and the fastening members 1780 may be, but are not limited to, pivot bolts or the like.

In use, in one embodiment, when the hitch assembly 1400 is coupled to the mover 120, the biasing members 1430 may bias the hitch assembly 1400 to generally align longitudinally with the mover 120. The hitch assembly 1400 may rotate in a generally horizontal plane about fastening member 1780a to allow the assembly 1400 and a cart 125 to turn and generally move during transport of the cart 125. The biasing members 1430 may help in returning the hitch assembly 1400 to a generally longitudinally aligned position following a turn.

When not in use, in one embodiment, and when a cart 125 is not coupled to the mover 120, the assembly 1400 may be placed in a storage position on the mover 120. That is, the hitch assembly 1400 may rotate in a vertical plane in the direction of arrows I, about fastening member 1780b, thereby allowing the assembly 1400 to "fold up" or "fold into" the mover 120 in a storage position. To remove the assembly 1400 from the storage position, the previously described process can be reversed. While the biasing members 1430 may bias to some extent during vertical rotation, the biasing members 1430 can be configured such that they do not substantially hinder the vertical rotation of the hitch stop assembly 1400.

The control assembly may be generally at least partially housed in the elongated body 1410 and may include one or more fastening members 1710, one or more biasing members 1715, an operating cable 1420, a rod 1720, a bell crank or swinging bracket 1725, a vertical plate 1730, a latch actuator 1740, a tubular member 1750, and/or a triangle plate 1755. In use, the release or disengagement of the rotating latch 1500 may be controlled via the control assembly. A first end of the cable 1420 may be operably coupled to a lever of the mover 120, and the opposite end of the cable 1420 may include a connective end 1760 that couples the second end of the cable 1420 to the bell crank or swinging bracket 1725. The sheath of the cable 1420 may be coupled via a coupling member 1765 to the body 1410, such that the inner cable portion can displace relative to the cable sheath when the lever of the mover 120 is displaced. The swinging bracket 1725 may also be coupled to the elongated body 1410 via a tab 1770, and a fastening member 1710. The swinging bracket 1725 may also be coupled to a rod 1720 and a biasing member 1715. The biasing member 1715 may also be coupled to a vertical plate 1730. The rod 1720 may also be coupled to a latch actuator 1740. The latch actuator 1740 may be coupled to a tubular member 1750 and a triangle plate 1755.

As indicated particularly in FIGS. 15A-16D, in one embodiment, as a cart 125 is brought into engagement with the hitch assembly 1400, the cart 125 may engage the cart engagement ramp 1745. The swinging or rotating latch 1500 of the hitch assembly 1400 may engage the cart frame 150, thereby generally securing the cart 125 to the mover 120 via the hitch assembly 1400. More specifically, the hook end 1520 may help to guide the cart 125 into engagement with the latch 1500. The hook end 1520, the middle portion 1515, and/or the elongated body end 1510 may each engage a side of the frame 150. The tab 1505 and the triangle plate 1755 may also engage the frame 150 and help maintain the cart frame 150 in an engaged position. Particularly, the triangle plate 1755 can act as a catch member, allowing a cart frame 150 to slide over the triangle plate 1755 and become engaged between the elongated body end 1510 and the triangle plate 1755, similar in manner to the catch members described above. The tab 1505 may engage a top portion of the cart frame 150, so as to maintain the cart 125 in an engaged position generally between the elongated body end 1510 and the triangle plate 1755. The triangle plate 1755 may be disengaged, as discussed in more detail below, using the control assembly.

As can be understood from FIGS. 15A-16D, and with reference to FIGS. 17A-F, to disengage the rotating latch 1500 from a cart 125, a lever of the cart mover 120 may be used to displace the cable 1420 of the control assembly, pulling the cable 1420 in the direction of arrow J. As the cable 1420 is pulled, the swinging bracket 1760 may be caused to pivot in a clockwise direction about the fastening member 1710. As the swinging bracket 1760 pivots, the biasing member 1715 and rod 1720 may follow, thereby rotating the latch actuator 1740 and pulling the triangle plate 1755 in a generally downward direction. When the triangle plate 1755 is in a generally downward position, the cart 125 may be free to move away from the latch 1500 and out of the engaged position generally held between the elongated body end 1510 and the triangle plate 1755. In this manner, the cart 125 may now be disengaged from the rotating latch 1500, such as by pulling the cart 125 away from the latch 1500 and back over the triangle plate 1755, which has been pulled in a generally downward direction. Once disengaged from the rotating latch 1500, the cart 125 may be removed from the hitch assembly 1400, the lever of the mover 120 may be released, and the above-described process may be reversed and the rotating latch 1500 may bias into its original position (as shown, for example, in FIG. 14A). Additionally, the triangle plate 1755 may bias back to its original position (as shown, for example, in FIG. 17F) from the generally downward position. While the phrase "triangle plate" is used herein, it is understood that the term "triangle" is not limiting, and the plate 1755 may be shaped in any suitable shape useful as a catch member in the manner described herein.

As discussed above, the cart coupling assembly may include engagement members configured to releasably couple a first cart to a second cart. In some embodiments, the engagement members of the cart coupling assembly may be pivotally coupled. In other embodiments, the engagement members may be coupled in a fixed relationship. FIGS. 18-20C illustrate one embodiment of components of a cart coupling assembly 115, including engagement members that may be pivotally coupled.

The cart coupling assembly 115 may be utilized to move multiple carts 125 at one time. The cart coupling assembly 115 may reduce the risk of damage to goods in the carts by hindering a trailing cart from hitting the cart or carts in front of it. The cart coupling assembly 115 may also increase efficiency because multiple carts can be moved at one time by a single operator and because the side to side movement during transport and turns can be more controlled.

Figure 18:
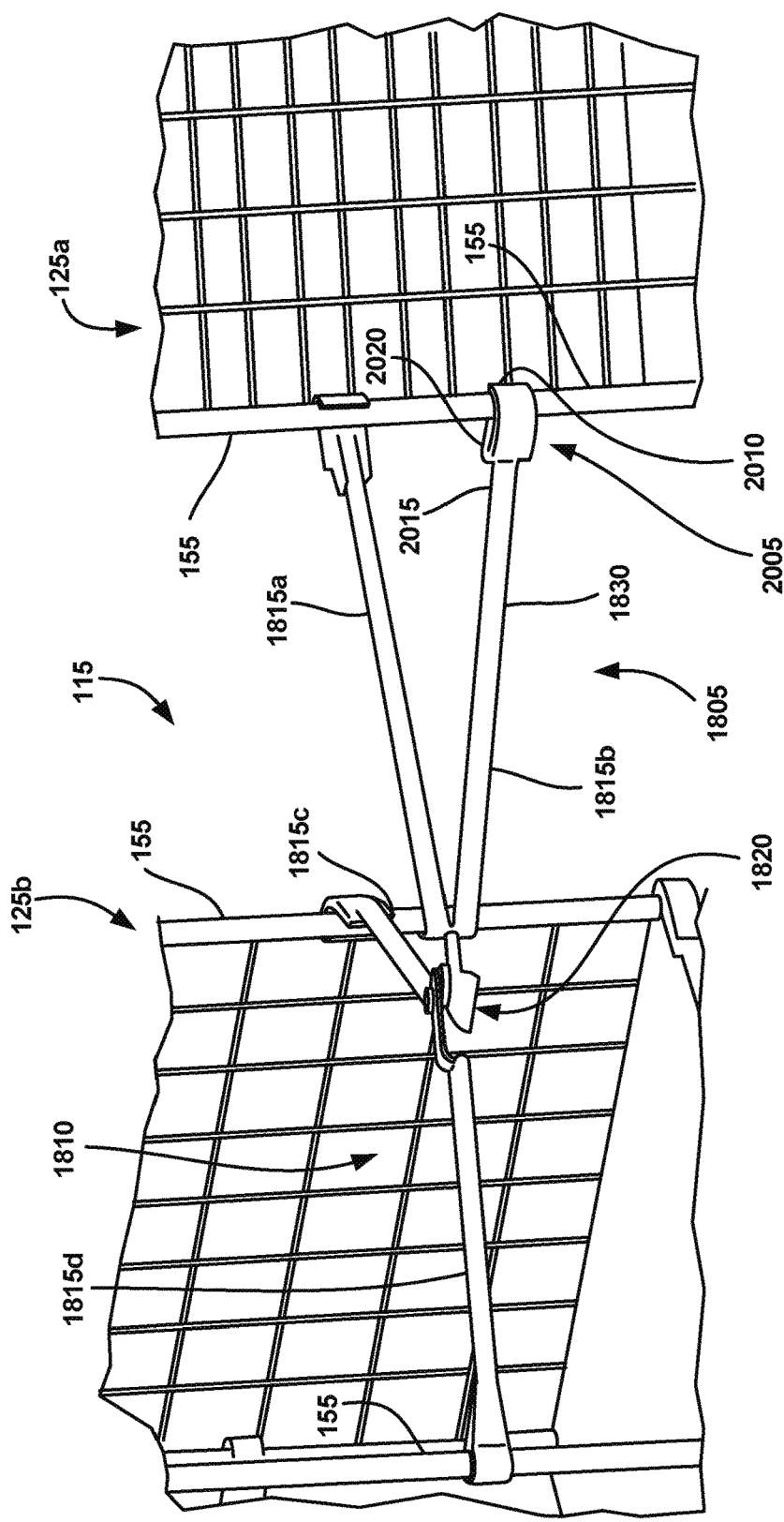
FIG. 18 is an enlarged isometric view of a cart coupling assembly according to one embodiment of the present disclosure.
Figure 19:
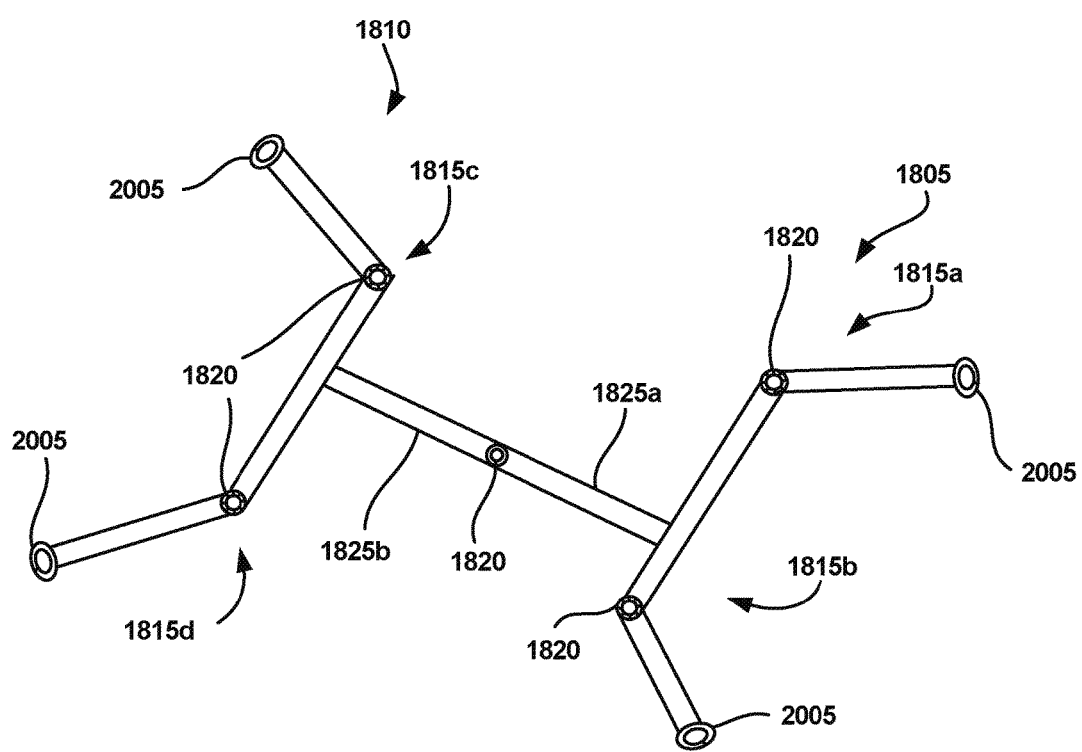
FIG. 19 is a top plan view of a cart coupling assembly according to another embodiment of the present disclosure.

As can be understood from FIG. 18, one embodiment of a cart coupling assembly 115 may include a first engagement portion 1805 and a second engagement portion 1810. Each portion 1805, 1810 may include one or more cart engagement members 1815. In one embodiment, the first portion 1805 and the second portion 1810 may be pivotally coupled such that the individual cart engagement members 1815a, 1815b, 1815c, 1815d are pivotally coupled to one another, wherein the members 1815a, 1815b, 1815c, 1815d share a generally common pivotal connection 1820. In other embodiments, the cart engagement members 1815 may be pivotally connected to one another at and through a plurality of pivotal connections 1820, as shown for example in FIG. 19. In FIG. 19, in one embodiment of a cart coupling assembly 115 with a plurality of pivotal connections, cart engagement members 1815 of the first portion 1805 and of the second portion 1810 may be connected such that a single arm 1825a, 1825b extends from each of the first and second portions 1805, 1810, respectively, and pivotally couples the first portion 1805 to the second portion 1810.

As discussed previously, the first portion 1805 and the second portion 1810 of the cart coupling assembly 115 may each include cart engagement members 1815. The engagement members 1815 may be constructed of stainless steel, aluminum, plastic, or other suitable material with strength appropriate for the weight of the load, or any combinations thereof. The engagement members 1815 may each engage a steel tube 155 of a wall 135 of a cart 125. As illustrated in FIG. 18, and in detail in FIGS. 20A-C, in one embodiment, a cart engagement member 1815 may include an arm 1830 and an engagement device 2005, which may include a hook 2010, a latch 2015, and a pivot rod 2020. The hook 2010 and latch 2015 may be releasably coupled to the steel tube engaging end of the engagement member 1815. The hook 2010 may engage the steel tube 155 of a wall 135 of a cart 125, and the latch 2015 may generally lock/secure or unlock/unsecure the hook 2010 to the steel tube 155. The hook 2010 may be generally C-shaped and may include a lip 2030 and a rod or protrusion 2035 on its inner circumference. The lip 2030 can help maintain the steel tube 155 of the cart 125 within the hook 2010, when engaged with the cart 125. As particularly shown in FIGS. 20B and C, the protrusion 2035 may engage the steel tube 155 of the cart 125 and can help maintain the steel tube 155 in position in the hook 2010 while permitting some rotational movement of the steel tube 155 within the hook 2010.

Figure 20A:
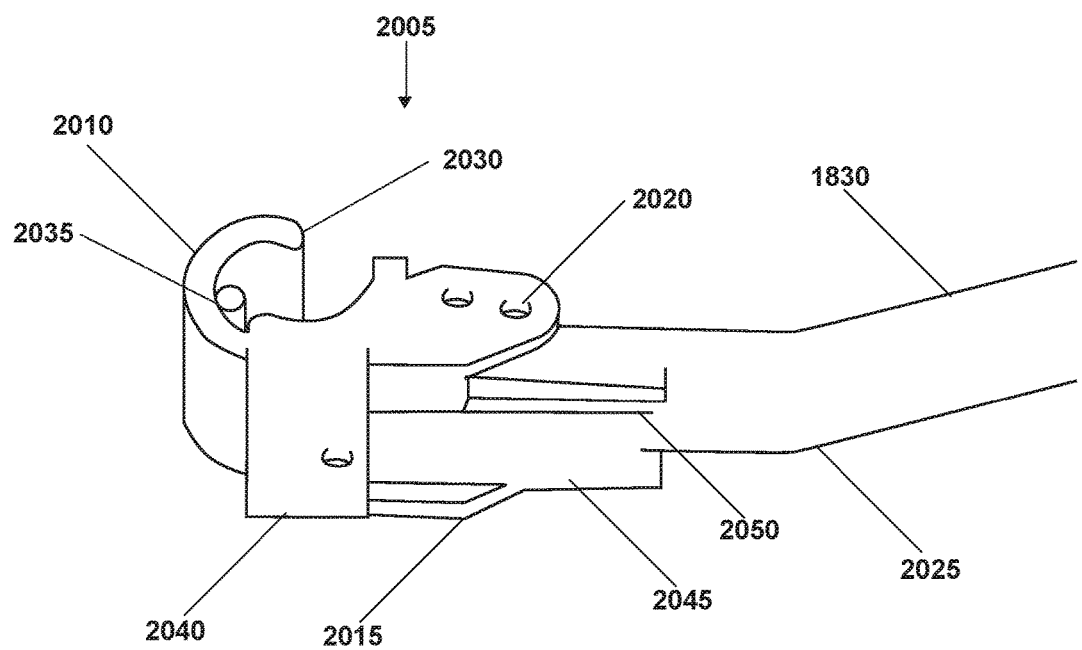
FIG. 20A is an isometric view of an engagement member of the cart coupling assembly of FIG. 18.
Figure 20B:
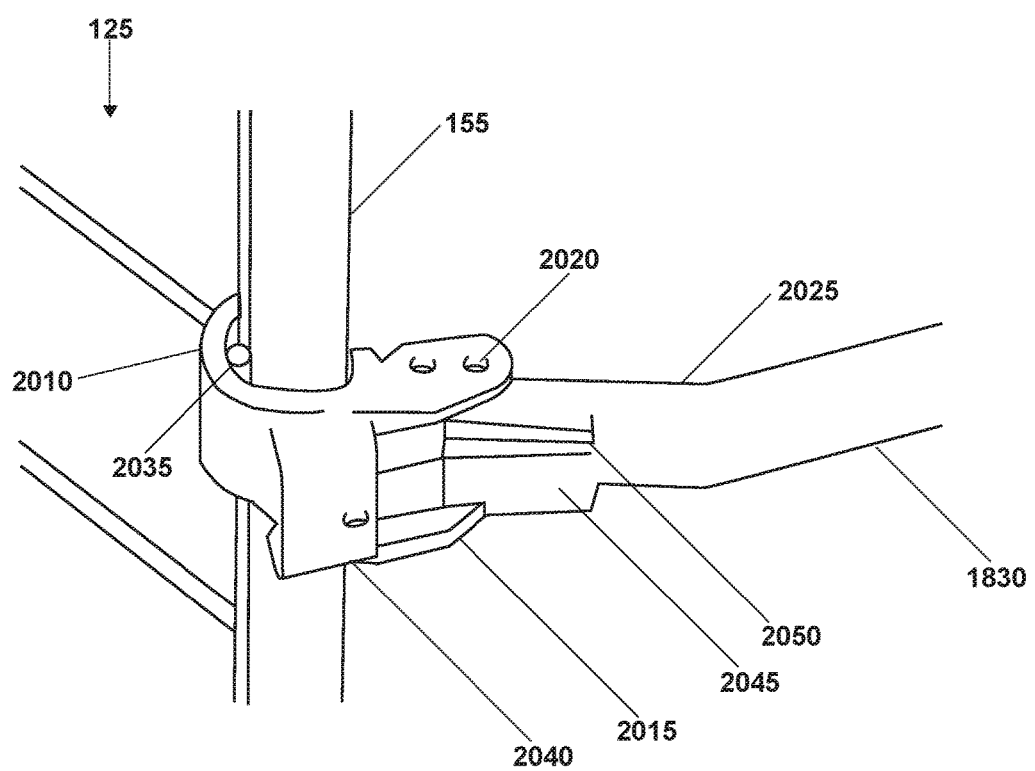
FIG. 20B is a side isometric view of the engagement member of FIG. 20A, wherein the engagement member is shown in an unlocked position.
Figure 20C:
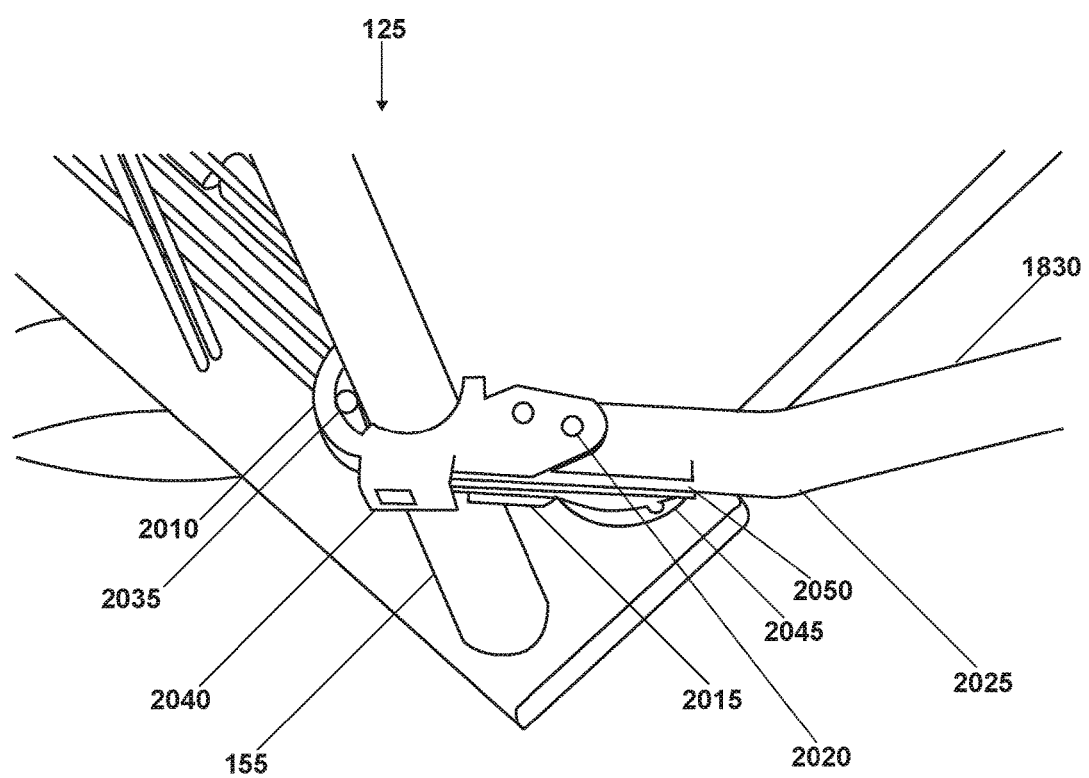
FIG. 20C is a top isometric view of the engagement member of FIG. 20A, wherein the engagement member is shown in a locked position.

The latch 2015 may include a grip member 2040 and a spring member 2045. The latch 2015 may be operably coupled to the arm 1830 via the pivot rod 2020. As shown in FIG. 20B, in one embodiment, the spring loaded latch 2015 may be deflected into an unlocked position upon introduction and engagement with a tube, such as the steel tube 155. During deflection, the spring member 2045 may slide along an anti-friction slide member 2050 located between the arm 1830 and the spring member 2045. Once engaged, in one embodiment, the latch 2015 can be self-locking. Particularly, the spring member 2045 may bias into its original position, as shown in FIGS. 20A and C, generally securing the engagement arm 1815 to the steel tube 155. The latch 2015 may be unlocked and the engagement device 2005 detached from the steel tube 155 by pulling on the grip member 2040, thereby biasing the spring member 2045 as the latch 2015 rotates about the pivot rod 2020.

As can be understood from FIGS. 18 and 20A-C, in one embodiment, the arms 1830 of the engagement members 1815a, 1815b of the first portion 1805 may be substantially straight and may have substantially equal length, and the arms 1830 of the engagement members 1815c, 1815d of the second portion 1810 may include a bend 2025 and may have substantially equal length. In one embodiment, the arms 1830 of the engagement members 1815a, 1815b of the first portion 1805 may have a different length than the arms 1830 of the engagement members 1815c, 1815d of the second portion 1810. However, in other embodiments, it is recognized that each of the engagement members 1815 may be configured and sized the same, or one or more of the engagement members 1815 may be configured and sized differently from the other engagement members, and all configurations and sizes are within the spirit and scope of the present disclosure. In use, in one embodiment, the engagement members 1815a, 1815b of the first portion 1805 may be coupled to a leading cart 125a, and the engagement members 1815c, 1815d of the second portion 1810 may be coupled to a trailing cart 125b. The bends 2025 in the arms 1830 of the engagement members 1815c, 1815d can help to maintain the orientation of the trailing cart 125b, such that it is moving forward or in-line with the leading cart 125a and the mover 120 rather than moving side-to-side relative to the leading cart 125a and the mover 120. However, it is also recognized that the engagement members 1815a, 1815b of the first portion 1805 may be coupled to a trailing cart 125b, and the engagement members 1815c, 1815d of the second portion 1810 may be coupled to a leading cart 125a. It is also recognized that any or all of the engagement members may or may not include a bend 2025 in the respective arm 1830.

Figure 21A:
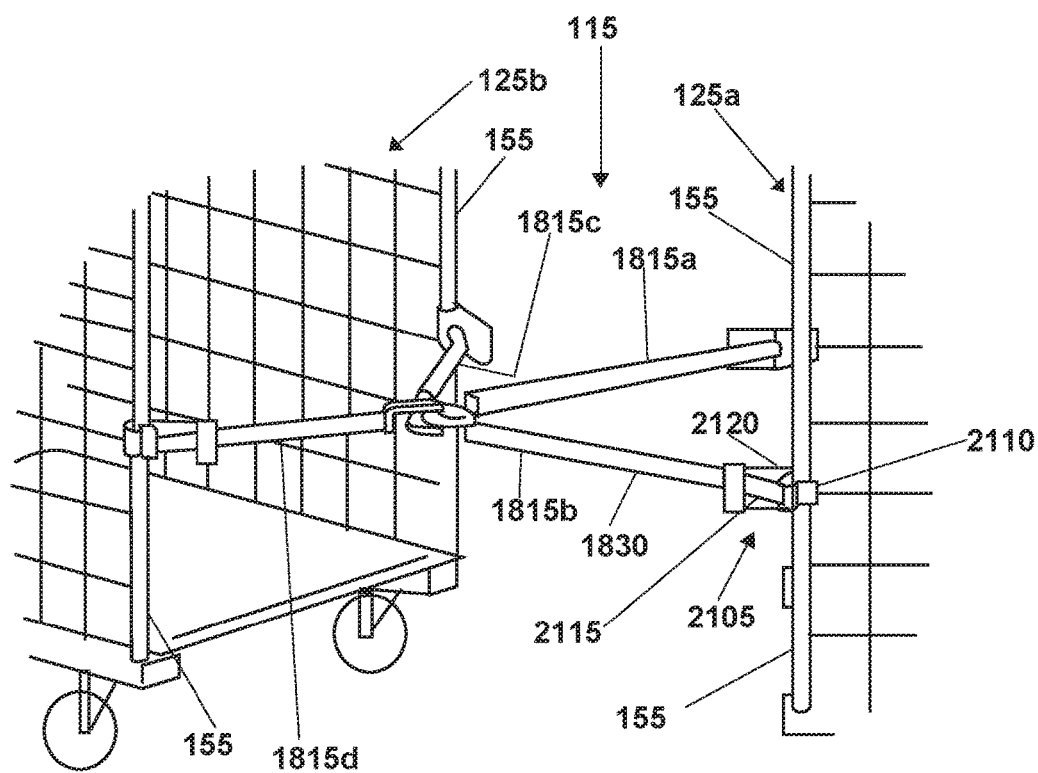
FIG. 21A is an enlarged isometric view of a cart coupling assembly according to a further embodiment of the present disclosure.
Figure 21B:
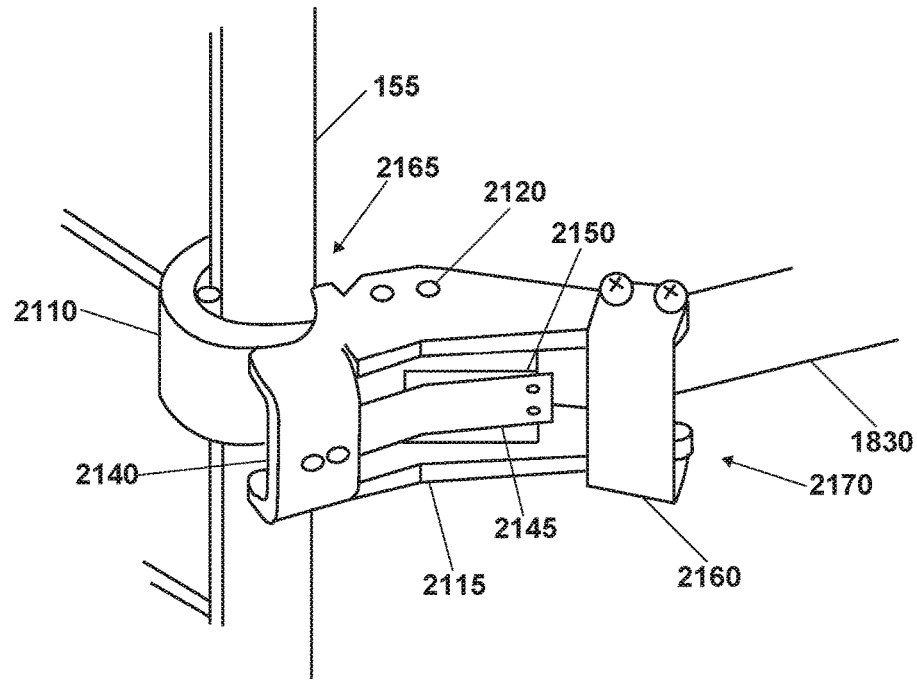
FIG. 21B is a side isometric view of an engagement member of FIG. 21A, wherein the engagement member is shown in an unlocked position.
Figure 21C:
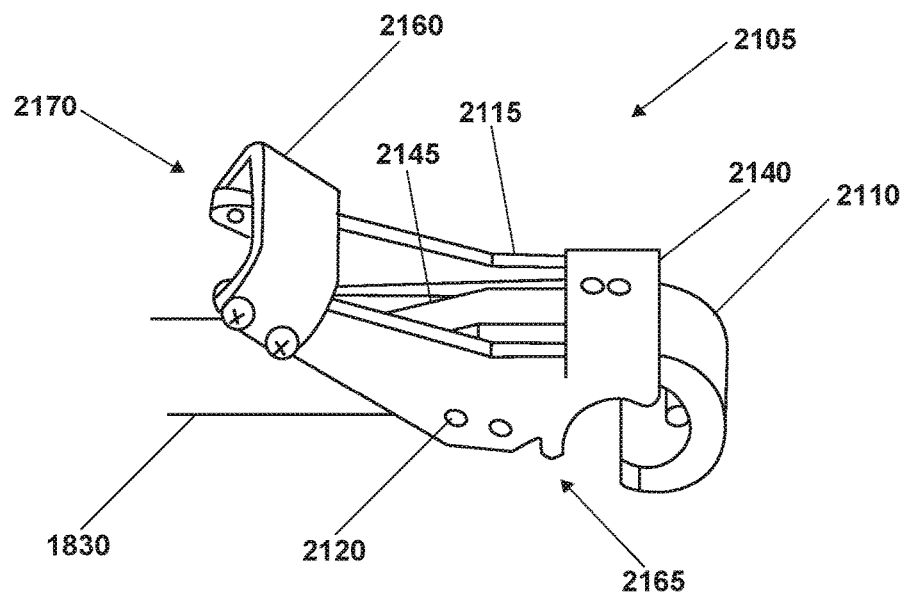
FIG. 21C is a top isometric view of the engagement member of FIG. 21A, wherein the engagement member is shown in a locked position.

FIGS. 21A-C illustrate another embodiment of a cart coupling assembly 115 having engagement members 1830, which may each include an arm 1830 and an engagement device 2105, which may include a hook 2110, a latch 2115, and a pivot rod 2120. As shown particularly in FIGS. 21B and C, the cart engagement device 2105 may further include a handle 2160.

Particularly, as can be understood from FIGS. 21A-C, in a second embodiment, the latch 2115 may include a first end 2165 and second end 2170. The first end 2165 of the latch 2115 may include a grip member 2140. The second end 2170 of the latch 2115 may include a handle 2160. The latch 2115 may be operably coupled to the arm 1830 via the pivot rod 2120. As shown in FIGS. 21B and C, in one embodiment, the spring loaded latch 2115 may be deflected into an unlocked position upon introduction and engagement with a tube, such as the steel tube 155. During deflection, a spring member 2145 may slide along an anti-friction slide member 2150 located between the arm 1830 and the spring member 2145. Once engaged, in one embodiment, the latch 2115 can be self-locking. Particularly, the spring member 2145 may bias into its original position, as shown in FIG. 21A, generally securing the engagement arm 1815 to the steel tube 155. The latch 2115 may be unlocked and the engagement device 2105 detached from the steel tube 155 by pushing on the handle 2160, thereby biasing the spring member 2145 as the latch 2115 rotates about the pivot rod 2120. Alternatively, the latch 2115 may be unlocked by pulling on the grip member 2140, thereby biasing the spring member 2145 as the latch 2115 rotates about the pivot rod 2120. Thus, the latch 2115 may lock/secure or unlock/unsecure the engagement member 1815 to a steel tube 155 of a cart 125. When desired, the engagement member 1815 may be disengaged from the steel tube 155 by pulling on the grip member 2140, or alternatively, the handle 2160 may be pressed thereby engaging a "press to release" feature and unlocking the latch 2115. An operator may then disengage the steel tube 155 of the cart 125 from the engagement member 1815.

Figure 22:
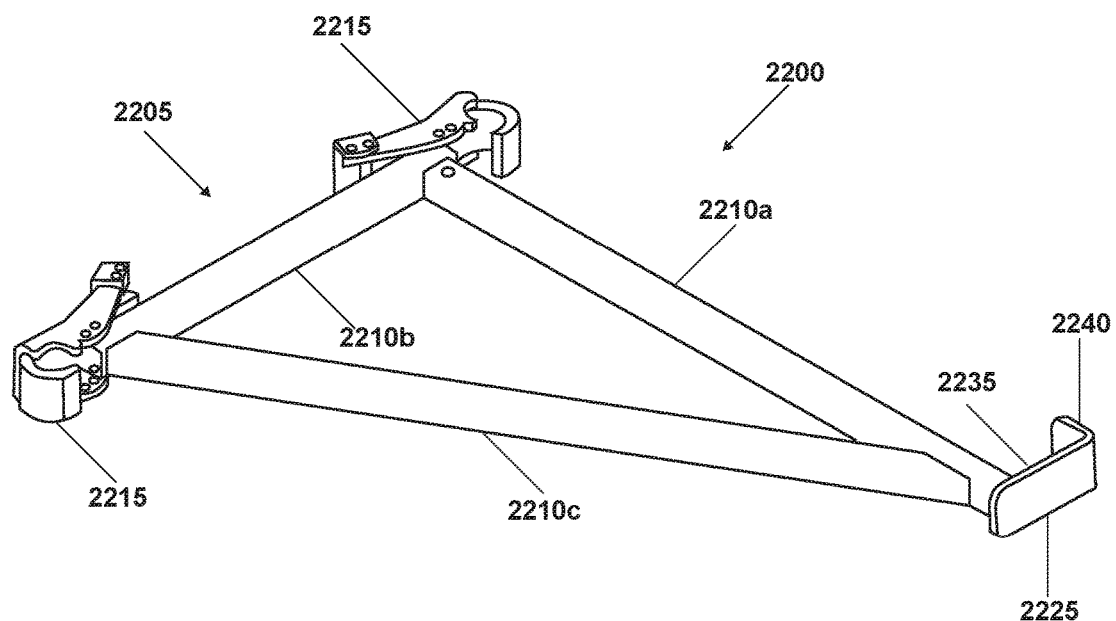
FIG. 22 is an isometric view of a cart coupling assembly according to yet another embodiment of the present disclosure.

While in some embodiments, the engagement members may be pivotally connected as described above, in some embodiments, an engagement member may include arms in a fixed relationship. FIGS. 22-24 illustrate one embodiment of components of a cart coupling assembly 2200, including an engagement member with arms that may be coupled in a fixed relationship.

As shown in FIGS. 22-24, in one embodiment, the cart coupling assembly 2200 may include an engagement member 2205. The engagement member 2205 may include arms 2210, first and second attachment members 2215, a telescoping member 2220, an engagement plate 2225, and a spring member 2230. The engagement member 2205 may be made of any suitable material, such as stainless steel, plastic, etc., or any combinations thereof. In some embodiments, the attachment members 2215 may be hooks and latches with associated operating components, as described above, and may operate similarly as described above.

In one embodiment, the engagement member 2205 may include an arm assembly formed from the arms 2210. A first end portion of a first arm 2210a may be joined to a first end portion of a second arm 2210b, and a second end portion of the first arm 2210a may be joined to a first end portion of a third arm 2210c. A second end portion of the second arm 2210b may be joined to a second end portion of the third arm 2210c. In one embodiment, the arms 2210 may form a generally right triangle shape. However, in other embodiments, the arm assembly may include greater or fewer arms 2210 and/or may form a different shape, such as but not limited to a square, rectangle, or equilateral triangle. Each arm 2210 may be joined to the other arms by any suitable connection method, including but not limited to welding or mechanically fastening. In one embodiment, an attachment member 2215 may be joined to each end portion of arm 2210b.

In one embodiment, arm 2210a may include the spring member 2230 housed within in the arm 2210a. The spring member 2230 may be secured, at one end, to arm 2210a, for example, using a mechanical fastener or the like. The spring member 2230 may be secured, at its other end, to a first end portion of the telescoping member 2220, for example, using a mechanical fastener 2305 or the like. The first end portion of the telescoping member 2220 may be telescopically received within the arm 2210a. The telescoping member 2220 may generally be slid relative to arm 2210a. Thus, in one embodiment, the spring 2230 may join the telescoping member 2220 to arm 2210a and prevent the telescoping member 2220 from being disconnected from arm 2210a.

An engagement plate 2225 may be joined to a second end portion of the telescoping member 2220. The engagement plate 2225 may include a long leg portion 2235 and a short leg portion 2240 that together define a generally L-shaped engagement plate 2225. A first end portion of the long leg 2235 may be joined to the telescoping member 2220. The long leg 2235 may extend generally transversely to a longitudinal axis of the telescoping member 2220 in a direction generally away from arm 2210a. The short leg 2240 may be joined at an end of the short leg to a second end portion of the long leg 2235. The short leg 2240 may extend from the long leg 2235 generally parallel to the longitudinal axis of the telescoping member 2220 in a direction generally towards the attachment member 2215a.

Figure 23A:
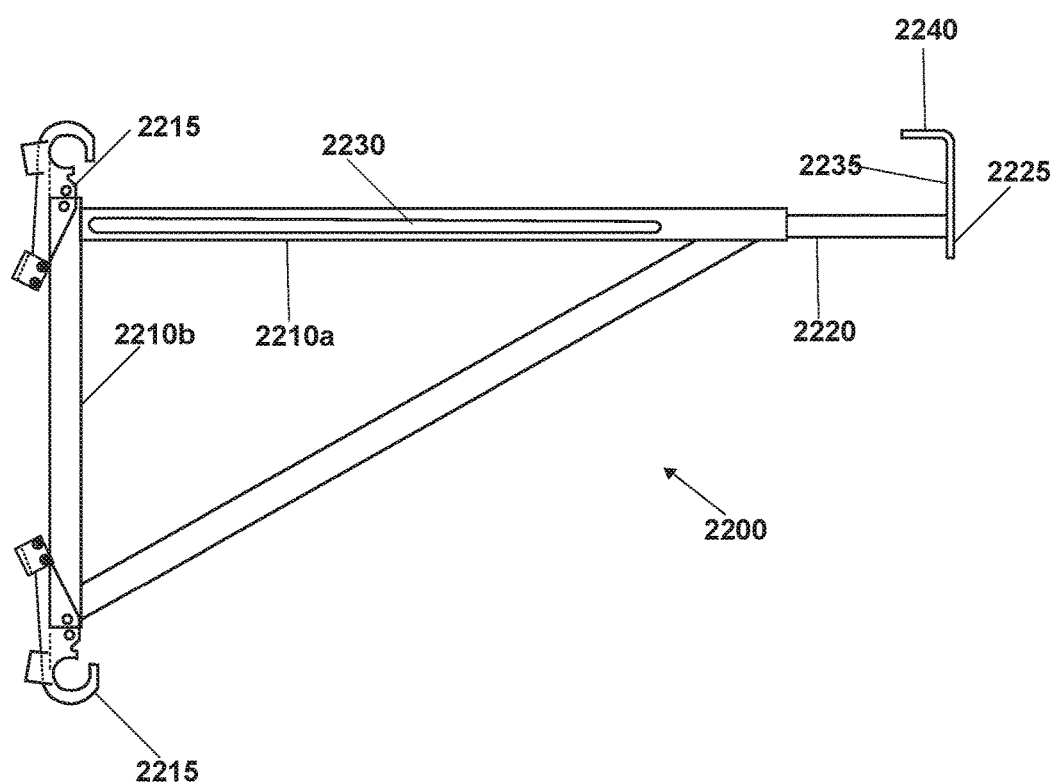
FIG. 23A is a top plan view of the cart coupling assembly of FIG. 22.
Figure 23B:
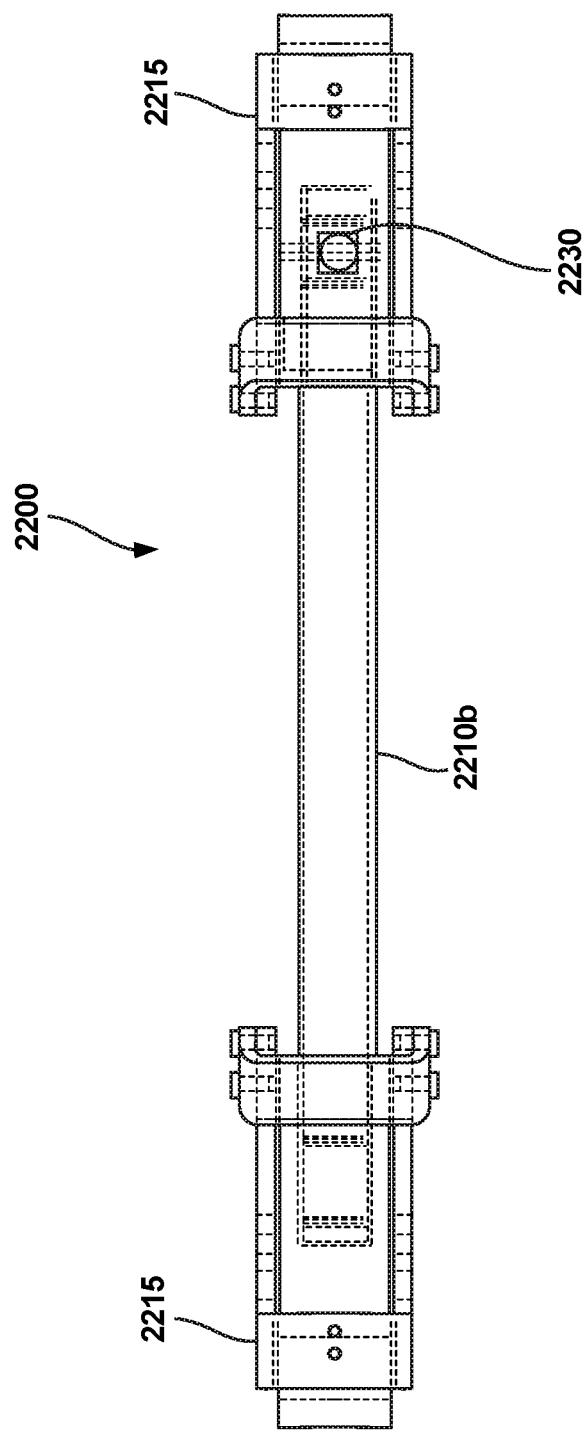
FIG. 23B is a front view of the cart coupling assembly of FIG. 22.
Figure 23C:
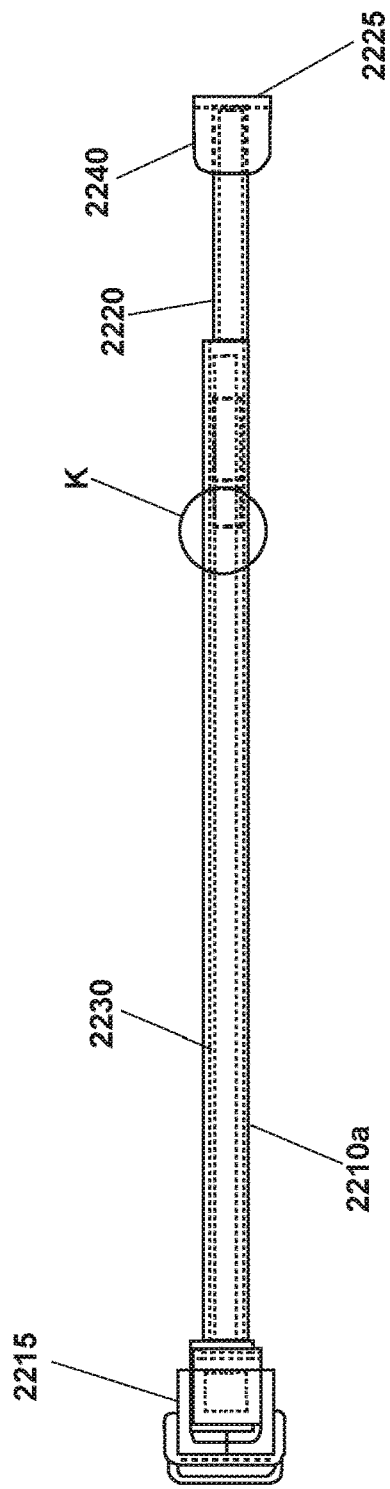
FIG. 23C is a side view of the cart coupling assembly of FIG. 22.
Figure 23D:
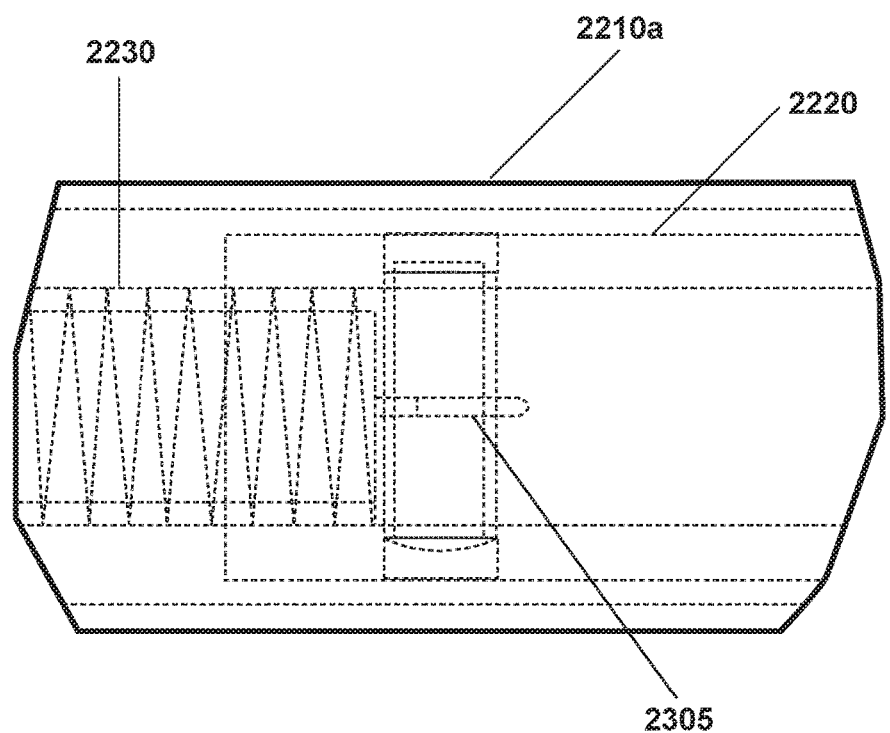
FIG. 23D is an enlarged view of area "K" of FIG. 23C.
Figure 24:
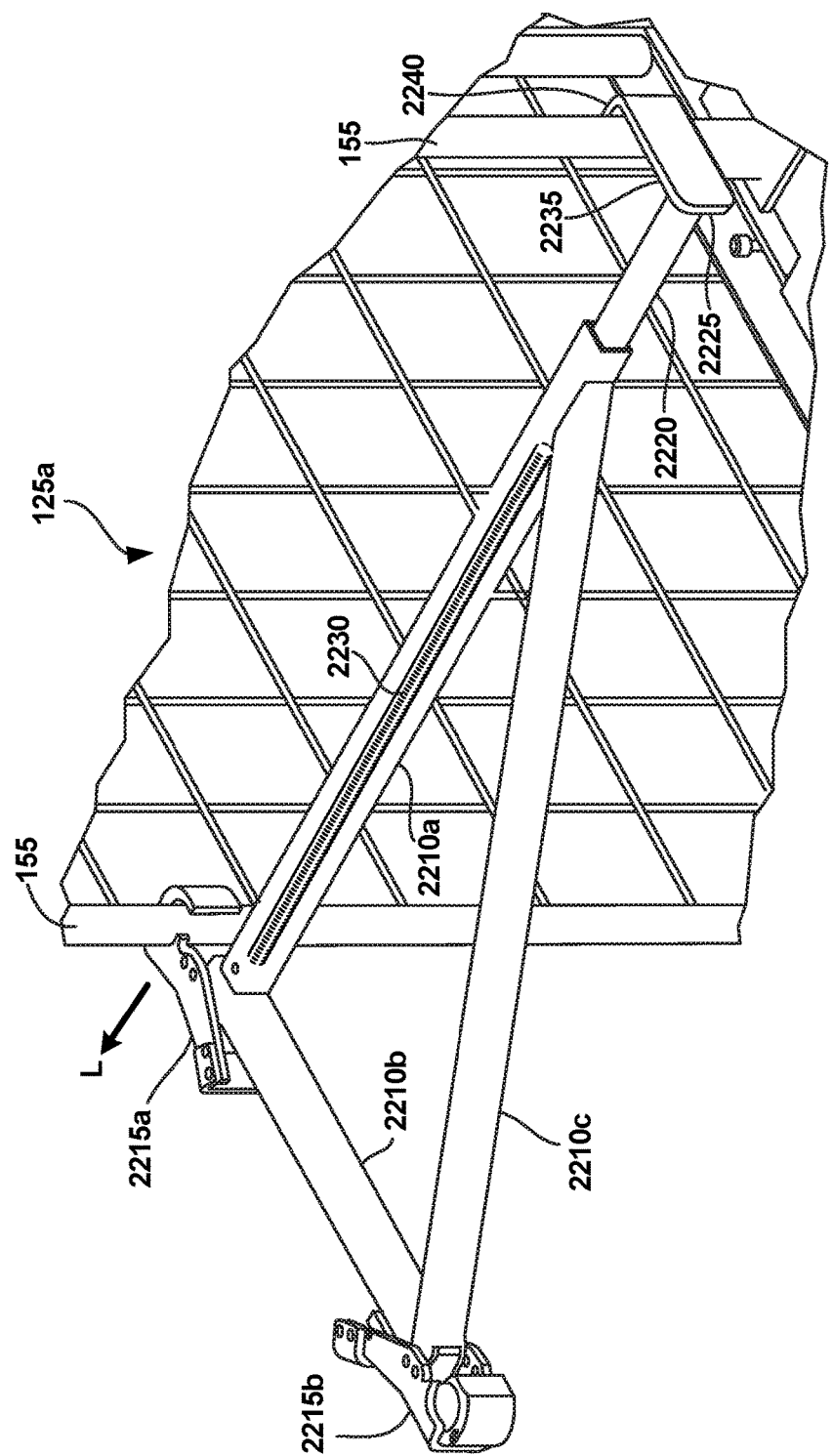
FIG. 24 is an isometric view of an embodiment of the cart coupling assembly of FIG. 22, shown in a partially engaged position.

In use, and as can be understood from FIGS. 22-23D, and with particular reference to FIG. 24, the engagement member 2205, in one embodiment, may be operably attached to a first cart 125a. More particularly, the engagement plate 2225 may be positioned such that the long 2235 and short legs 2340 partially encompass a first tube 155 of the first cart 125a, as shown, for example, in FIG. 24. The arm assembly may be pulled generally in the direction of arrow L. As the arm assembly is pulled in direction L, the long leg 2235 of the engagement plate 2225 may engage the first tube 155. Further pulling of the arm assembly in the direction L can result in the first arm 2210a sliding relative to the telescoping member 2220 in the direction L, thereby moving the first attachment member 2215a away from engagement plate 2225. The arm assembly may continue to be moved in the direction L until the first attachment member 2215a is proximate a second tube 155. The first attachment member 2215a may then be engaged with or coupled to the second tube 155 of the first cart 125a, as described in detail above.

As the first arm 2210a slides relative to the telescoping member 2220 in the direction L, spring member 2230 may stretch from an initial rest position. Upon joining the first attachment member 2215a to the second tube 155, spring member 2230 may pull engagement plate 2225 toward the first attachment member 2215a, thus engaging the long leg 2235 of the engagement plate 2225 with the first tube 155. Such engagement can help resist separation of the engagement plate 2225 from the first tube 155 in directions generally parallel to L. Further, positioning the short leg 2240 on an inside portion of the first tube 155 can help resist separation of the engagement plate 2225 from the first tube 155 in directions generally toward the arm assembly. More particularly, if the first cart 125a should move generally perpendicularly to the longitudinal axis of first arm 2210a in a direction away from the first arm 2210a, the first tube 155 can engage the short leg 2240. Such engagement can help prevent further movement of the first cart 125a away from the first arm 2210a, thus maintaining the joining of the engagement member 2205 to the first cart 125a. The engagement member 2205 can be constrained to rotate about the first attachment member 2215a, whereby the rotation is limited by the engagement plate 2225 on the first tube 155.

In one embodiment, to disengage the engagement member 2205 from the first cart 125a, the first attachment member 2215a may be disconnected from the second tube 155, as described in detail above. Once disengaged, spring member 2230 may return toward its initial rest position, thus moving first attachment member 2215a in a direction toward the engagement plate 2225. Engagement plate 2225 may then be moved away from first tube 155 and disengaged from the cart 125a.

Figure 25A:
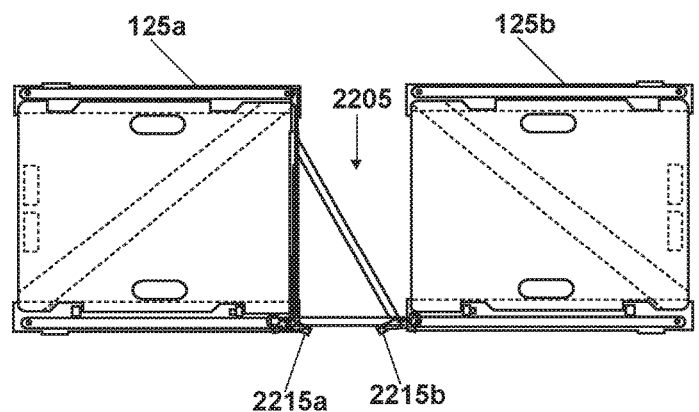
FIG. 25A is a top plan view of the cart coupling assembly of FIG. 22, shown in an engaged position.
Figure 25B:
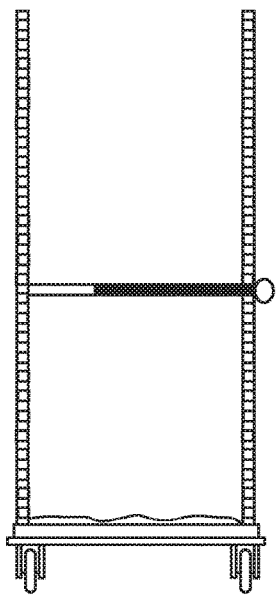
FIG. 25B is a front view of the cart coupling assembly of FIG. 22 shown in an engaged position.
Figure 25C:
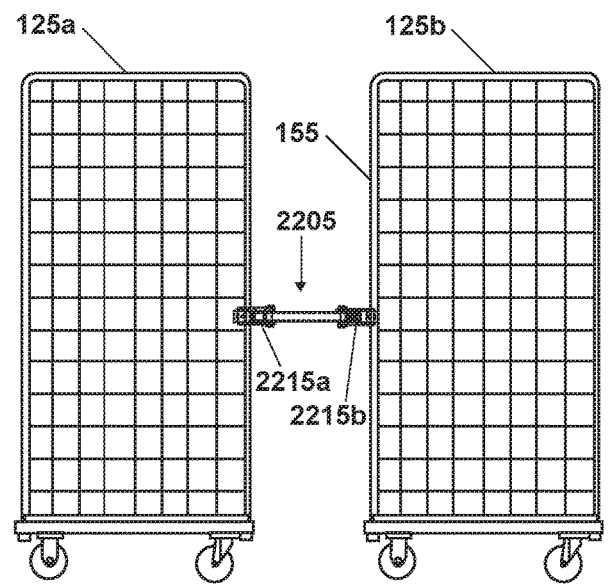
FIG. 25C is a side view of the cart coupling assembly of FIG. 22 shown in an engaged position.
Figure 25D:
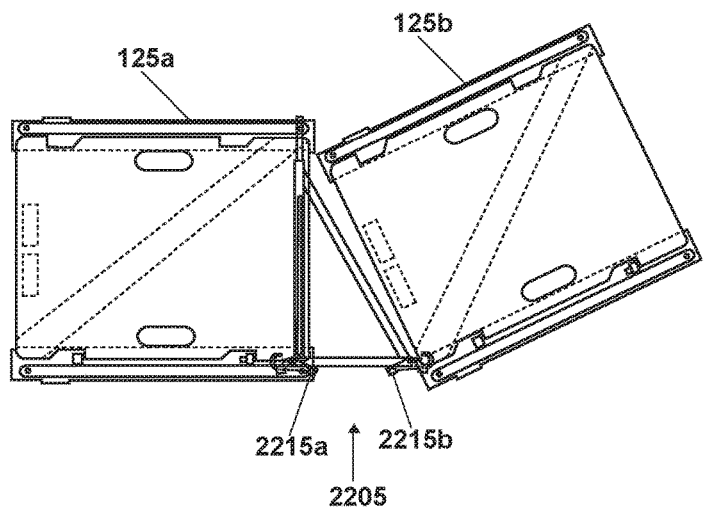
FIG. 25D is a top plan view of the cart coupling assembly of FIG. 22 shown in an engaged position with relative rotational movement of at least one cart.
Figure 25E:
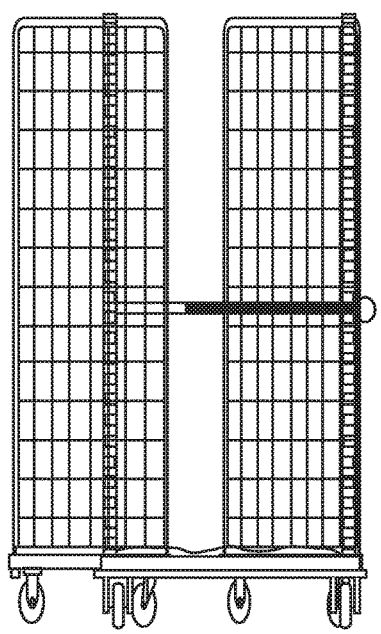
FIG. 25E is a front view of the cart coupling assembly of FIG. 22 shown in an engaged position with relative rotational movement of at least one cart.
Figure 25F:
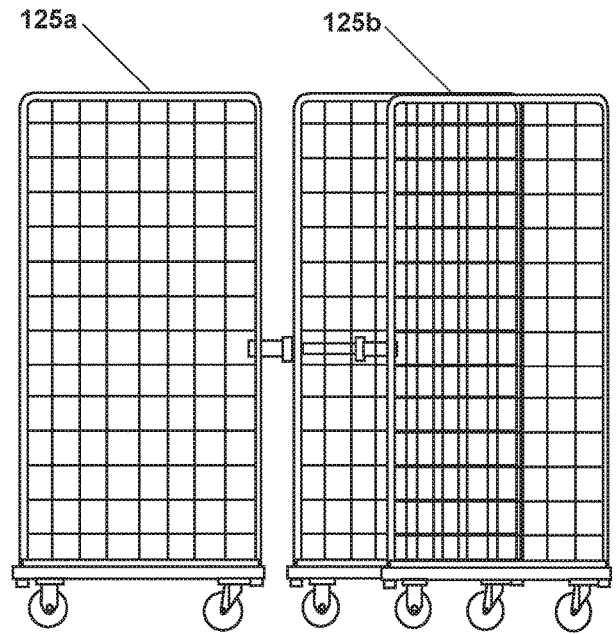
FIG. 25F is a side view of the cart coupling assembly of FIG. 22 shown in an engaged position with relative rotational movement of at least one cart.
Figure 25G:
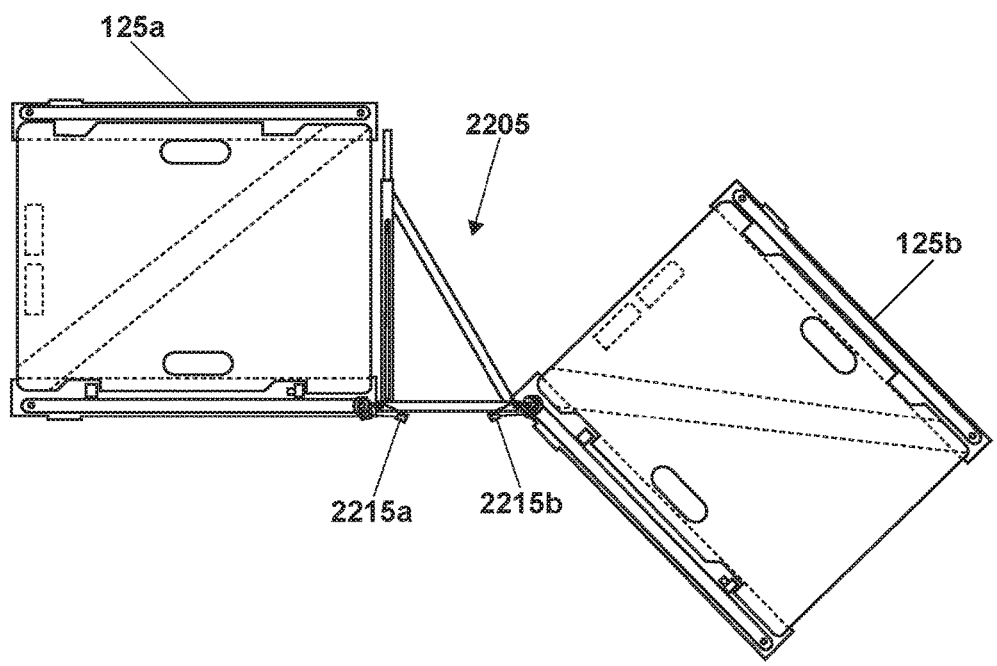
FIG. 25G is a top plan view of the cart coupling assembly of FIG. 22 shown in an engaged position with relative rotational movement of at least one cart.
Figure 25H:
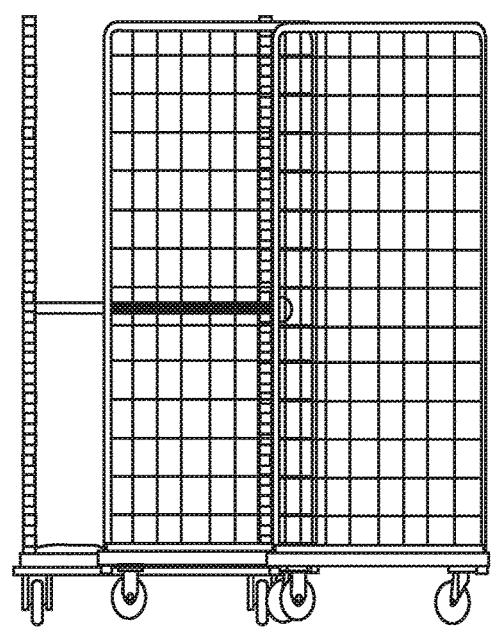
FIG. 25H is a front view of the cart coupling assembly of FIG. 22 shown in an engaged position with relative rotational movement of at least one cart.
Figure 25I:
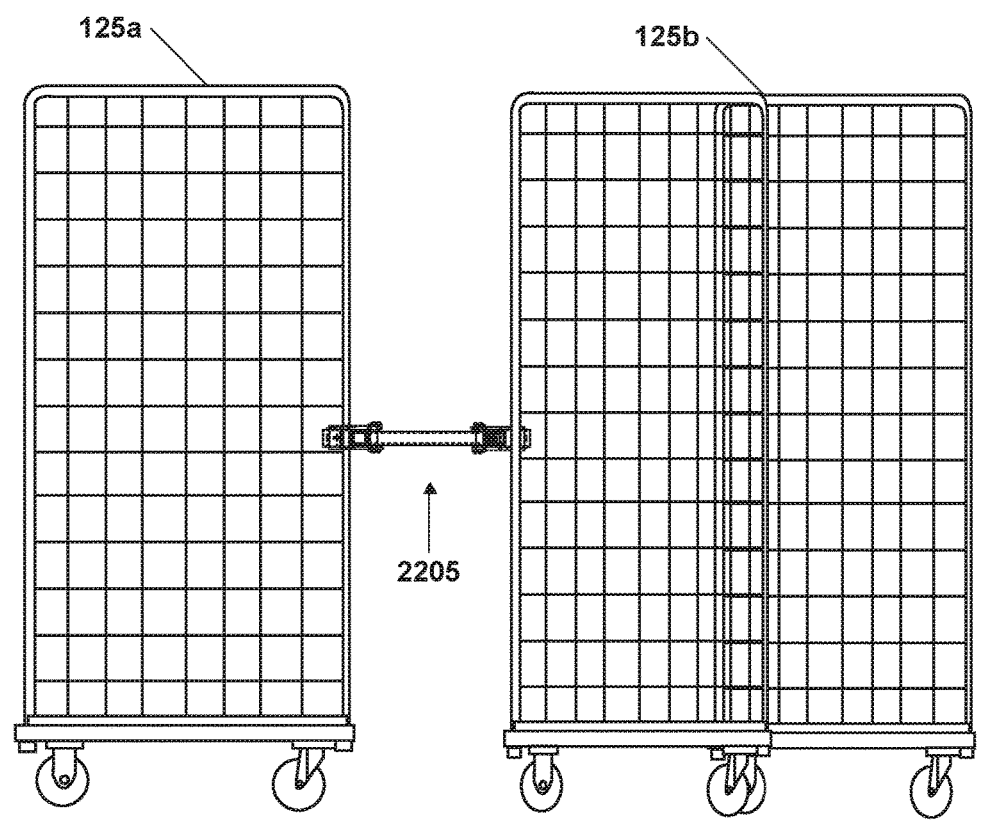
FIG. 25I is a side view of the cart coupling assembly of FIG. 22 shown in an engaged position with relative rotational movement of at least one cart.
Figure 26:
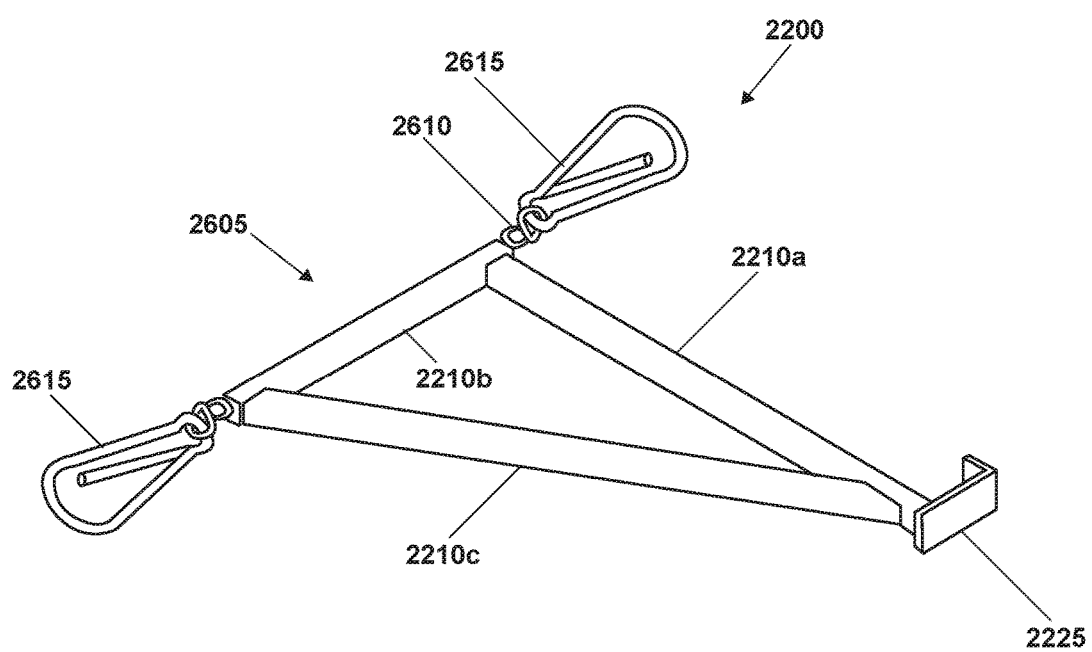
FIG. 26 is an isometric view of a cart coupling assembly according to another embodiment of the present disclosure.
Figure 27:
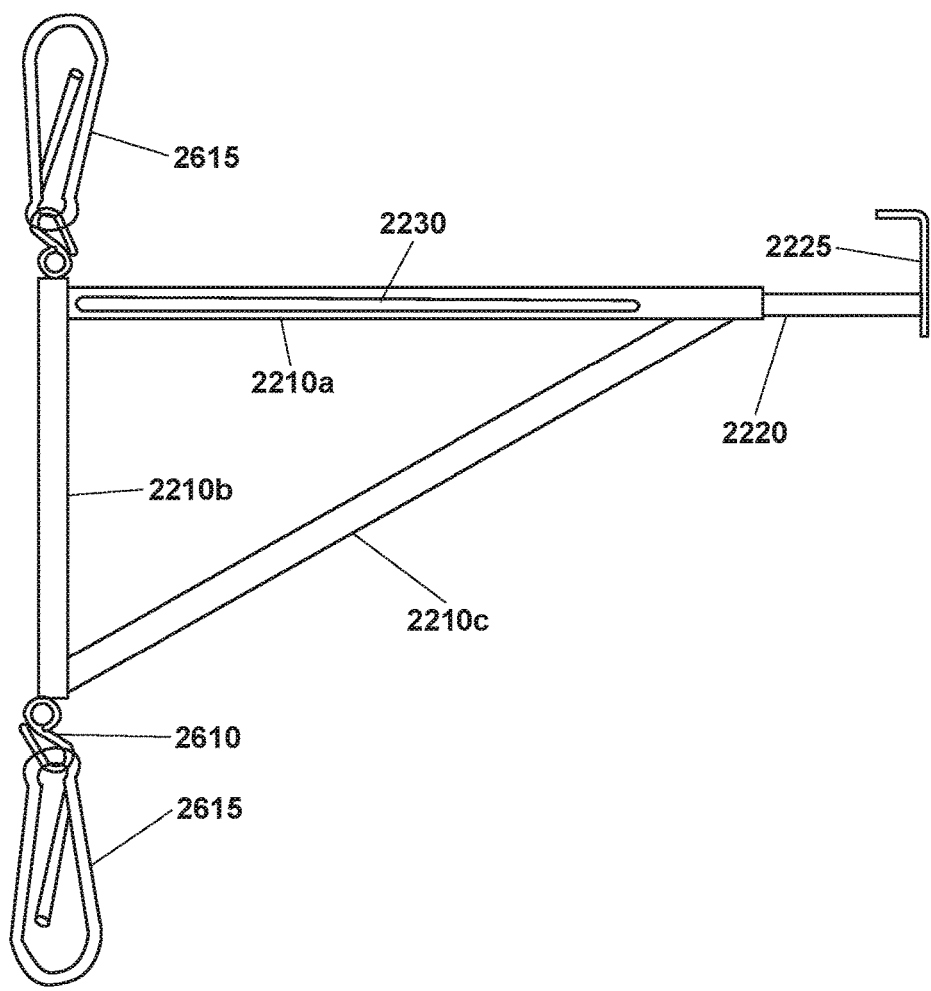
FIG. 27 is a top plan view of the cart coupling assembly of FIG. 26.
Figure 28:
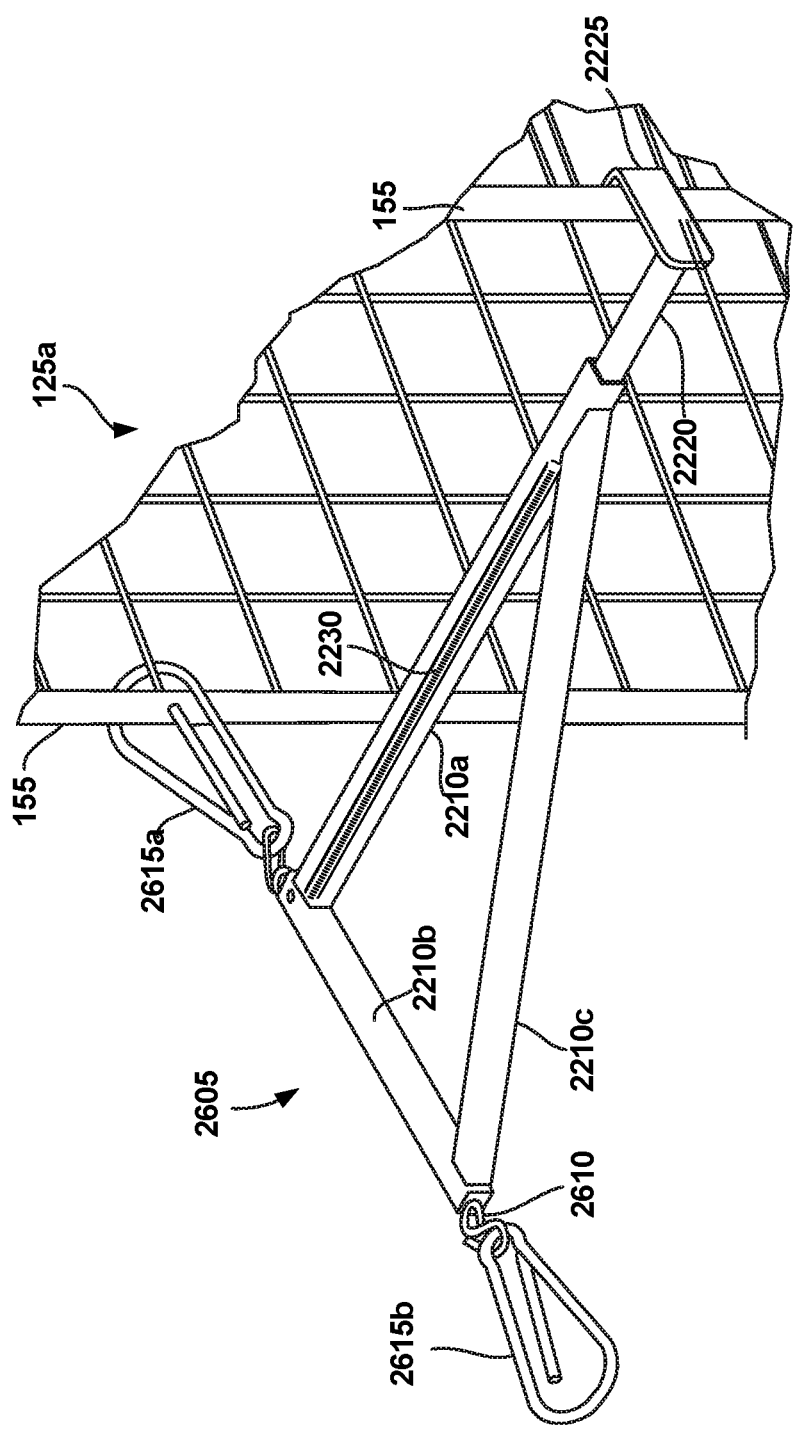
FIG. 28 is an isometric view of an embodiment of the cart coupling assembly of FIG. 26, shown in a partially engaged position.
Figure 29A:
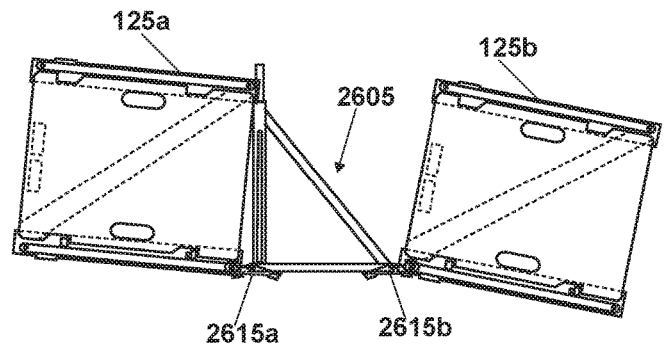
FIG. 29A is a top plan view of the cart coupling assembly of FIG. 26 shown in an engaged position with relative rotational movement of at least one cart.
Figure 29B:
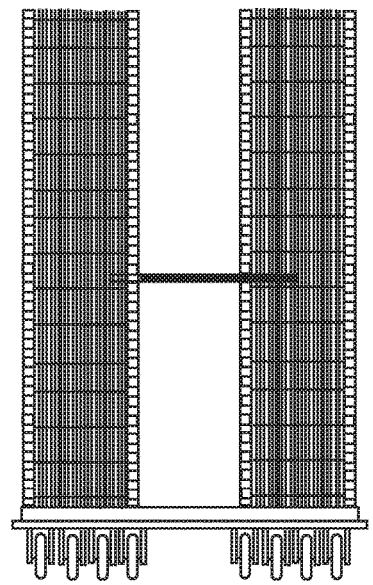
FIG. 29B is a front view of the cart coupling assembly of FIG. 26 shown in an engaged position with relative rotational movement of at least one cart.
Figure 29C:
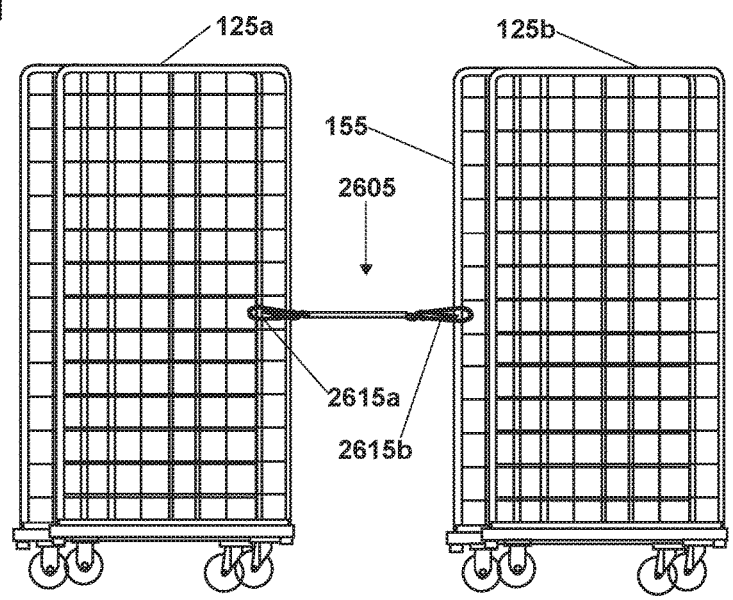
FIG. 29C is a side view of the cart coupling assembly of FIG. 26 shown in an engaged position with relative rotational movement of at least one cart.

As illustrated in FIGS. 25A-I, in one embodiment, the engagement member 2205 may be joined to a second cart 125b. To join engagement member 2205 to second cart 125b, second cart 125b may be positioned proximate engagement member 2205. The second attachment member 2215b may then be coupled to a third tube 155 of second cart 125b. Once the first and second carts 125a and b are joined to engagement member 2205, the carts 125a and b may be moved in unison, and the trailing cart may follow the leading cart, for example, as illustrated in FIGS. 25A-I. Further, the engagement member 2205 can limit relative rotation of the first cart 125a to the second cart 125b. More particularly, if second cart 125b should rotate relative to first cart 25a from a first position as shown in FIG. 25A to a second position as shown, for examples, in FIGS. 25D and 25G, such rotation is about second attachment member 2215b.

To disengage the engagement assembly from carts 125a and b, the attachment members 2215 may be released, as described above, to disengage the attachment members 2215 from their respective tubes 155, and the spring member 2230 may bias into its initial rest position, thus allowing the engagement plate 225 to be disengaged from the first tube 155 of the first cart 125a, as described above.

FIGS. 26-29C illustrate another embodiment of a cart coupling assembly 2200 including an engagement member 2605 having attachment members 2615 that are configured as carabiners. The carabiners may be attached to the arms 2210 by any suitable connection method, such as but not limited to, using mechanical fasteners 2610. The embodiments of cart coupling assembly 2200 of FIGS. 26-29 having attachment members 2615 that are configured as carabiners may be used and operated similarly to the embodiments of cart coupling assemblies described above with respect to FIGS. 22-25. While carabiners are illustrated, it is also recognized that other types of latches, hooks, connectors, or the like may be suitable for use as engagement members for the various embodiments of cart coupling assemblies 2200 of the present disclosure.

As can be understood from the figures, with particular reference to FIG. 1, the various embodiments of hitch assemblies and cart coupling assemblies may be used together as a cart transporting apparatus. As can be further understood from the figures, the hitch assemblies may be utilized to releasably couple a cart mover to a cart. For the ease of the reader, the description refers to the movement of the cart relative to the mover as if the mover were in front of the cart. In one embodiment, an operator may position the mover in front of the cart and engage the catch members. A hitch stop can be used to hinder the forward progress of the cart, such that an appropriate flange will abut the floor of the cart.

Additional carts may be operably or pivotally coupled to the first cart via cart coupling assemblies. Engagement members may be releasably coupled to the steel tube of the carts. The hook of an engagement member may start to engage the steel tube of a cart, thereby biasing the latch of the engagement member such that the latch is in an unlocked position. Once the steel tube is in position within the hook, the latch can bias into a locked position and the hook maintains the steel tube and the cart in position for transport.

Once the carts reach their destination, the carts may be disengaged from the cart transporting apparatus. The first cart may be removed from the mover by releasing the catch members via a cable and lever assembly attached to the mover and coupled to the hitch stop assembly, as described above. The additional carts may be disengaged from each other by unlocking the latches of the engagement members of the cart coupling assemblies and disengaging the steel tubes from the engagement members.

It should be noted that all directional references set forth herein (e.g., upper, lower, upward, downward, left, right, leftward, rightward, top, bottom, above, below, vertical, horizontal, clockwise, and counterclockwise) are relative and only used for identification purposes to aid the reader's understanding of the embodiments of the present invention, and are not limitations, particularly as to the position, orientation, or use of the invention unless specifically set forth in the claims. References to any joinder of elements (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

We claim:

1. An apparatus for transporting carts comprising:
   (a) a hitch assembly comprising:
      (i) an elongated body including a first end and a second end, the first end configured to be operably coupled to a cart mover;
      (ii) at least one catch member operably coupled to the second end of the body; and
      (iii) a hitch stop operably coupled to said body and comprising a swinging latch having a hook end; and
   (b) a cart coupling assembly comprising:
      (i) a first portion comprising first and second engagement members;
      (ii) a second portion pivotally coupled to the first portion, wherein the second portion comprises third and fourth engagement members; and
      wherein each of the first, second, third, and fourth engagement members comprises first and second ends, wherein each of the first ends of the first, second, third, and fourth engagement members comprises a hook and a latch.

2. The apparatus of claim 1, wherein the swinging latch further comprises an elongated body end and a middle portion, such that in an engaged position with a cart, one or more of the elongated body end of the swinging latch, the middle portion, and the hook end engage a side of a frame of the cart.

3. The apparatus of claim 1, wherein the catch member is a triangle plate.

4. The apparatus of claim 1, wherein each of the first, second, third, and fourth engagement members further comprises a handle.

5. The apparatus of claim 1, wherein the at least one catch member is biased in a first position for engaging a cart and moveable to a second position allowing the cart to be disengaged.

6. The apparatus of claim 5, further comprising a control assembly for controlling movement of the at least one catch member from the first position to the second position.

7. The apparatus of claim 6, wherein the control assembly is partially housed in the elongated body.

8. The apparatus of claim 6, wherein the control assembly further comprises an operating cable.

9. The apparatus of claim 8, further comprising at least one fastening member, at least one biasing member, a rod, a swinging bracket, a vertical plate, a latch actuator, and a tubular member.

10. The apparatus of claim 8, wherein the operating cable further comprises a first end operably coupled to a lever arranged on the cart mover, and a second end coupled to the swinging latch.

11. The apparatus of claim 10, wherein the lever is actuatable to move the at least one catch member from the first position to the second position to disengage the cart.

12. The apparatus of claim 11, wherein the hitch assembly is rotatable along a vertical plane to move the hitch assembly into a storage position.

13. An apparatus for transporting carts, comprising:
(a) a hitch assembly comprising:
   (i) an elongated body including a first end and a second end, the first end configured to be operably coupled to a cart mover;
   (ii) at least one catch member operably coupled to the second end of the body; and
   (iii) a hitch stop operably coupled to said body and comprising a swinging latch having a hook end; and
(b) a cart coupling assembly comprising:
   (i) a first portion comprising first and second engagement members; and
   (ii) a second portion comprising third and fourth engagement members,
   wherein each of the first, second, third, and fourth engagement members comprises first and second ends, wherein each of the first ends of the first, second, third, and fourth engagement members comprises a hook and a latch.

14. The apparatus of claim 13, wherein the at least one catch member is biased in a first position for engaging a cart and moveable to a second position allowing the cart to be disengaged.

15. The apparatus of claim 14, further comprising a control assembly for controlling movement of the at least one catch member from the first position to the second position.

16. The apparatus of claim 13, wherein the swinging latch further comprises an elongated body end and a middle portion, such that in an engaged position with a cart, one or more of the elongated body end of the swinging latch, the middle portion, and the hook end engage a side of a frame of the cart.

17. The apparatus of claim 13, wherein the first portion of the cart coupling assembly is pivotally coupled to the second portion.

* * * * *